United States Patent
Shinohara et al.

[11] Patent Number: 6,167,182
[45] Date of Patent: *Dec. 26, 2000

[54] SURFACE LIGHT SOURCE DEVICE AND LIQUID CRYSTAL DISPLAY DEVICE, PORTABLE TELEPHONE AND INFORMATION TERMINAL EMPLOYING THE SURFACE LIGHT SOURCE DEVICE

[75] Inventors: Masayuki Shinohara; Shigeru Aoyama, both of Kyoto, Japan

[73] Assignee: Omron Corporation, Kyoto, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/091,429

[22] PCT Filed: Oct. 27, 1997

[86] PCT No.: PCT/JP97/03892

§ 371 Date: Jun. 25, 1998

§ 102(e) Date: Jun. 25, 1998

[87] PCT Pub. No.: WO98/19105

PCT Pub. Date: May 7, 1998

[30] Foreign Application Priority Data

Oct. 25, 1996 [JP] Japan .................................. 8-301073

[51] Int. Cl.⁷ .................................................... G02B 6/10
[52] U.S. Cl. ............................................................ 385/129
[58] Field of Search .................................. 385/129, 130, 385/132, 147; 257/232, 233, 432; 369/109, 110, 112, 44.11; 438/69, 71; 359/619

[56] References Cited

U.S. PATENT DOCUMENTS

| | | | |
|---|---|---|---|
| 5,481,515 | 1/1996 | Kando et al. | 369/44.12 |
| 5,593,913 | 1/1997 | Akio | 359/619 |
| 5,691,548 | 11/1997 | Akio | 257/232 |

FOREIGN PATENT DOCUMENTS

| | | |
|---|---|---|
| 0453092 | 10/1993 | European Pat. Off. . |
| 47-4958 | of 1972 | Japan . |
| 61-165504 | 10/1986 | Japan . |
| 61-240506 | 10/1986 | Japan . |
| 64-18508 | 1/1989 | Japan . |
| 64-45003 | 2/1989 | Japan . |
| 1-152406 | 10/1989 | Japan . |
| 4-6706 | 1/1992 | Japan . |
| 4-61302 | 5/1992 | Japan . |
| 5-107542 | 4/1993 | Japan . |
| 5-210014 | 8/1993 | Japan . |
| 5-216030 | 8/1993 | Japan . |
| 6-36001 | 5/1994 | Japan . |
| 6-230378 | 8/1994 | Japan . |
| 6230378 | 8/1994 | Japan . |
| 6-250025 | 9/1994 | Japan . |
| 7-114023 | 5/1995 | Japan . |
| 7-43700 | 9/1995 | Japan . |
| 8-203312 | 8/1996 | Japan . |
| 8-248421 | 9/1996 | Japan . |
| 8-271893 | 10/1996 | Japan . |
| 8-286037 | 11/1996 | Japan . |
| 8-2866037 | 11/1996 | Japan . |
| 8-146227 | 6/1998 | Japan . |

*Primary Examiner*—Akm E. Ullah
*Attorney, Agent, or Firm*—Foley & Lardner

[57] ABSTRACT

In a surface light source device using a so-called point light source, the luminance distribution is made uniform, and the luminance thereof is increased. The direction of each of a plurality of diffuse pattern elements 24a constituting a diffuse pattern 24 formed on the lower surface of an optical waveguide plate 22 (a direction along the length) is at an angle of approximately 90° to a direction along the line connecting the diffuse pattern element 24a and a point light source 30. The density ρ of the diffuse pattern elements is approximately zero in the vicinity of the point light source 30, while linearly increasing as the distance from the point light source 30 increases.

31 Claims, 33 Drawing Sheets

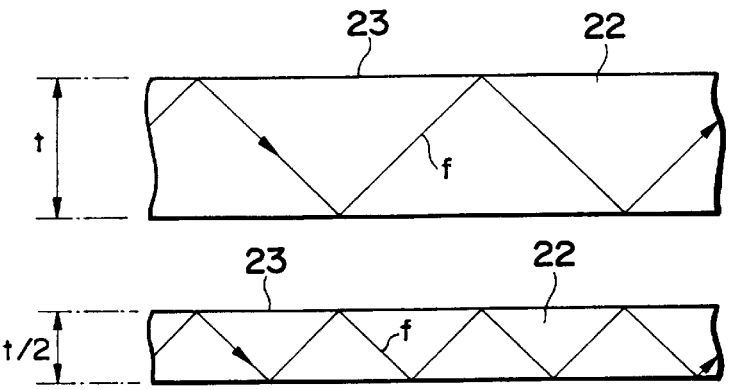
Fig. 29a
Fig. 29b
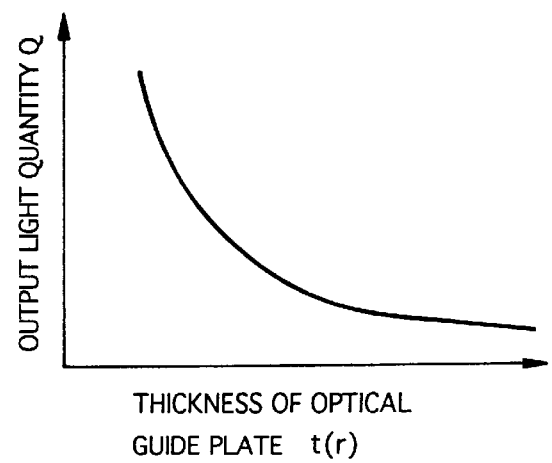
Fig. 30

SURFACE LIGHT SOURCE DEVICE AND LIQUID CRYSTAL DISPLAY DEVICE, PORTABLE TELEPHONE AND INFORMATION TERMINAL EMPLOYING THE SURFACE LIGHT SOURCE DEVICE

TECHNICAL FIELD

The present invention relates to a surface light source device used for a liquid crystal display device, a lighting device or the like, and a liquid crystal display device, a portable telephone and an information terminal using the surface light source device.

BACKGROUND ART

A conventional surface light source device is illustrated in FIGS. 1 and 2. FIG. 1 is an exploded perspective view, and FIG. 2 is a cross-sectional view. A surface light source device 1 comprises an optical (wave)guide plate 2 for confining and propagating light, a light emitting device 3, and a reflecting plate 4. The optical guide plate 2 is formed of resin which is transparent and has a high index of refraction, for example, polycarbonate resin or methacrylic resin, and a diffuse pattern 5 is formed by irregular processing, dot printing of diffuse reflective ink or the like on the lower surface of the optical guide plate 2. The light emitting device 3 is one having a plurality of so-called point light sources 7, for example, light emitting diodes (LED) mounted on a circuit board 6, and is opposite to an end surface (a light incidence surface 8) of the optical guide plate 2. The reflecting plate 4 is formed of a white resin sheet, for example, which has a high index of reflection, and is affixed to the lower surface of the optical guide plate 2 on both its sides by double-sided tapes 9.

Light emitted from the light emitting device 3 and introduced into the optical guide plate 2 from the light incidence surface 8 is confined in the optical guide plate 2 and travels by being totally reflected from the inside of the optical guide plate 2. The light inside the optical guide plate 2 is diffuse reflected upon impinging on the diffuse pattern 5. A light beam f1, incident on a light output surface 10 at a smaller angle than the critical angle in the total reflection, of the reflected light beams is emitted outward from the light output surface 10. A light beam f2 passing through a portion, where the diffuse pattern 5 does not exist, on the lower surface of the optical guide plate 2 is returned to the optical guide plate 2 again upon being reflected from the reflecting plate 4, so that the loss of the quantity of light on the lower surface of the optical guide plate 2 is prevented from occurring.

In the conventional surface light source device 1, however, a light beam f3, entering a portion between the lower surface of the optical guide plate 2 and the reflecting plate 4, of the light beams emitted from the light emitting device 3 enters the optical guide plate 2 from the lower surface of the optical guide plate 2 upon being reflected from the reflecting plate 4, and is emitted from the light output surface 10 of the optical guide plate 2 without being totally reflected, as shown in FIG. 3. Therefore, the intensity of the output light is large in the vicinity of the light incidence surface 8, as shown in a graph of light output intensity characteristics on the light output surface 10 in FIG. 4. As a result, the luminance of the emitted light is high in the vicinity of the light incidence surface 8 (an area where the luminance is high is indicated by reference numeral 11), and the degree of non-uniformity of the luminance distribution on the light output surface 10 of the optical guide plate 2 is high.

In the surface light source device 1, a linear light source such as a cold-cathode ray tube or a hot-cathode ray tube is replaced with the point light sources 7 such as light emitting diodes in order to reduce the power consumption. The point light sources 7 such as light emitting diodes are disposed in line and brought into a pseudo linear light source. Used is the optical guide plate 2 which is fabricated in accordance with the same design philosophy as that in a case where the linear light source is used. Particularly, the diffuse pattern 5 on the optical guide plate 2 is the same as that in the case where the linear light source is used. That is, reflecting elements 5a constituting the diffuse pattern 5 are disposed in a direction parallel to the light incidence surface 8, as shown in FIG. 6. As the distance from the light incidence surface 8 increases, the density of the reflecting elements gradually increases. Since the optical guide plate 2 suitable for the point light sources 7 is not used, the luminance distribution is non-uniform not only in a direction along the length of the optical guide plate 2 (the direction in which light travels in the optical guide plate 2 upon being totally reflected) but also a direction along the width thereof as shown in FIG. 7 (a direction perpendicular to the direction along the length, that is, an X—X direction shown in FIG. 6).

In the conventional surface light source device 1, a light beam f4, reaching an end surface opposite to the light incidence surface 8 and both side surfaces thereof, of the light beams propagating while being confined inside the optical guide plate 2 leaks outward from the end surface or the side surfaces, so that the utilization efficiency of the light is reduced, and the luminance of the surface light source device 1 is particularly decreased at edges of the light output surface 10.

Furthermore, the diffuse pattern 5 is designed in accordance with the same philosophy as that in the optical guide plate for the linear light source, as described above, in the optical guide plate 2 used in the conventional surface light source device 1, and all the reflecting elements 5a are disposed with they being directed in the same direction. Since the directionality of the diffuse pattern 5 is not designed such that the best light output efficiency is obtained with respect to the point light sources 7, so that the output efficiency of the optical guide plate 2 is low, and the luminance of the surface light source device 1 is decreased.

DISCLOSURE OF INVENTION

An object of the present invention is to increase the utilization efficiency of light from a light source in a surface light source device using a smaller light source, as compared with the width of a light incidence surface of an optical guide plate (that is, a point light source or ones similar thereto).

Another object of the present invention is to make it possible to make the luminance distribution on a light output surface uniform in a surface light source device using a smaller light source, as compared with the width of a light incidence surface of an optical guide plate.

Still another object of the present invention is to provide a liquid crystal display device, a potable telephone and an information terminal using the above-mentioned surface light source device.

A surface light source device according to the present invention comprises an optical guide plate for confining and propagating light introduced from a light incidence surface and emitting the light outward from a light output surface, and a light source, smaller than the width (the length of a side on which the light output surface and the light incidence surface meet) of the light incidence surface of the optical guide plate, disposed on the side of the light incidence surface of the optical guide plate. A diffuse pattern is formed almost all over a surface, on the opposite side of the light output surface, of the optical guide plate. Each of a plurality of diffuse pattern elements constituting the diffuse pattern has directionality in its shape. A predetermined angular relationship exists between a direction defined by the directionality of the diffuse pattern element and a direction along the line connecting the diffuse pattern element and the light source.

In the angular relationship between the direction defined by the directionality of the diffuse pattern element and the direction along the line connecting the diffuse pattern element and the light source, a variation or dispersion is allowed within a range in which the amount of light emitted from the light output surface is not substantially changed.

It is preferable that the size of the light source (the length, along the width of the light incidence surface, of the light source) is not more than one-half the width of the light incidence surface. It is more desirably not more than approximately one-fifth the width of the light incidence surface because the light source can be substantially handled as a point light source. In a case where a plurality of light sources are disposed, close to one another, the length of the whole of a range in which the light sources are disposed can be set to the size of the light sources.

According to the present invention, the direction defined by the directionality in the shape of each of the plurality of diffuse pattern elements constituting the diffuse pattern has a predetermined angular relationship with the direction along the line connecting the diffuse pattern element and the light source. Therefore, the angular relationship is set to the most suitable relationship in consideration of the output efficiency of the light emitted from the light output surface of the optical guide plate, so that the utilization efficiency of the light, that is, the output rate can be maximized within a range in which the plurality of diffuse pattern elements are provided. In consideration of the density of the diffuse pattern elements as described later, it is possible to obtain illumination which is uniform and high in luminance almost all over the surface of the optical guide plate.

In one mode of the present invention, the direction defined by the directionality of the diffuse pattern element is a direction along the length of the diffuse pattern element. The direction along the length is approximately perpendicular to the direction along the line connecting the diffuse pattern element and the light source. The approximately perpendicular direction is a direction which allows a variation or dispersion of approximately ±30° with respect to the perpendicular direction. The direction along the length of the diffuse pattern element and the direction along the line connecting the diffuse pattern element and the light source are made approximately perpendicular to each other, so that the output rate of light is the highest, thereby making most effective light utilization possible.

In one mode of the shape of the diffuse pattern element, the cross section of the diffuse pattern element in the direction along the line connecting the diffuse pattern element and the light source is close to an isosceles triangle.

When the cross section of the diffuse pattern element is close to an isosceles triangle, light incident on the diffuse pattern from the side of the light source can be emitted from the light output surface upon being diffuse reflected, and light returned upon being reflected from an end surface, on the opposite side of the light source, of the optical guide plate can be emitted from the light output surface upon being diffuse reflected. Particularly, the diffuse pattern element in such a shape is suitable for a case where a structure for return reflecting light is provided on the end surface of the optical guide plate.

In another mode, the cross section of the diffuse pattern element in the direction along the line connecting the diffuse pattern element and the light source is close to a right angled triangle.

When the cross section of the diffuse pattern element is close to a right angled triangle, the density of the diffuse pattern elements can be increased, so that the light output efficiency can be improved.

In still another mode, the cross section of the diffuse pattern element in the direction along the line connecting the diffuse pattern element and the light source includes an arc-shaped edge.

Since a peripheral surface of the diffuse pattern element includes an arc-shaped surface, light incident on the diffuse pattern can be reflected almost uniformly over a wide angle, thereby contributing to the uniformity of the distribution of emitted light.

In a further mode of the present invention, the length of the diffuse pattern element decreases as the distance from the light source decreases.

Particularly when the diffuse pattern element has a linear side, the distance between a part of the diffuse pattern element and the light source can differ depending on the part of the diffuse pattern element. The shortest distance between the part of the diffuse pattern element and the light source is referred to as the shortest distance, and the longest distance there between is referred to as the longest distance. The nearer the diffuse pattern element is to the light source, the larger the difference between the longest distance and the shortest distance becomes. The fact that the difference is large means that the intensity and the direction of emitted light easily vary depending on the part of the diffuse pattern element. If the nearer the diffuse pattern element is positioned to the light source, the shorter the length thereof is, the intensity and the direction of emitted light which are caused by the diffuse pattern element can be made uniform, thereby contributing to the uniformity of the light intensity in the whole of the surface light source device.

In a still further mode of the present invention, a surface of the optical guide plate is divided into a plurality of areas by lines extending radially from the light source, a plurality of diffuse pattern elements being provided for each of the areas.

The quantity of light emitted from the light source has an angle distribution. If the surface of the optical guide plate is divided into the plurality of areas by the lines extending radially from the light source, it is possible to design for each of the areas the arrangement or the like of the diffuse pattern elements depending on the intensity of the light, which is introduced into the area, from the light source. It is possible to cope with the light quantity distribution depending on the direction of the light emitted from the light source.

When a plurality of light sources are provided so as to face to the light incidence surface of the optical guide plate, a surface of the optical guide plate is divided into a plurality of areas in correspondence with the light sources. In one mode, the directions in which the plurality of diffuse pattern elements are arranged in each of the areas have a predetermined angular relationship with directions along the lines connecting the corresponding light source and the diffuse pattern elements.

When there are provided a plurality of light sources, and the light sources are relatively spaced apart from one another, the above-mentioned diffuse pattern is realized for each of the areas corresponding to the light sources, so that the utilization efficiency of light can be increased for each of the areas, and the luminance distribution in the surface light source device can be made uniform in consideration of the density of the diffuse pattern elements as described later.

In another mode, the directions of the plurality of diffuse pattern elements have a predetermined angular relationship with directions along the lines connecting the light sources which are taken as one light source and the diffuse pattern elements.

When the plurality of light sources are relatively close to each other, the whole of the light sources can be taken as one light source, so that the diffuse pattern can be simplified.

A surface light source device according to the present invention is defined as follows from another point of view. That is, a surface light source device according to the present invention comprises an optical guide plate for confining light introduced from a light incidence surface and emitting the light outward from a light output surface, and a light source, smaller than the width of the light incidence surface of the optical guide plate, disposed on the side of the light incidence surface of the optical guide plate. A diffuse pattern is formed almost all over a surface, on the opposite side of the light output surface, of the optical guide plate. Each of a plurality of diffuse pattern elements constituting the diffuse pattern has a surface directed toward the light source, a direction normal to the surface being approximately parallel to a plane which includes a direction along the line connecting the diffuse pattern element and the light source and is perpendicular to the light output surface of the optical guide plate. The approximately parallel direction is a direction which allows a variation or dispersion of approximately ±30°.

The light incident on the diffuse pattern is greatly changed in the travel direction on a surface directed toward the light source (the angle of reflection of the light is small, or the light passes through the surface), so that the rate of light output is increased.

When the boundary of the diffuse pattern elements is unclear or random so that each of the diffuse pattern elements is not clear, the present invention can be expressed by the correlation length.

Specifically, a surface light source device according to the present invention which is applied to such a case comprises an optical guide plate for confining light introduced from a light incidence surface and emitting the light outward from a light output surface, and a light source, smaller than the width of the light incidence surface of the optical guide plate, disposed on the side of the light incidence surface of the optical guide plate. A diffuse pattern is formed almost all over a surface, on the opposite side of the light output surface, of the optical guide plate. A partial area of the diffuse pattern has directionality in relation to the shapes of a plurality of diffuse pattern elements in the partial area. The direction in which the correlation length of the diffuse pattern in the partial area is the longest has an approximately predetermined angular relationship with a direction along the line connecting the partial area and the light source. The foregoing is based on the premise that the correlation length of the diffuse pattern in the partial area differs in at least two directions (which may not be perpendicular to each other).

In the angular relationship between the direction in which the correlation length of the diffuse pattern is the longest and the direction along the line connecting the partial area and the light source, a variation or dispersion is allowed within a range in which the quantity of light emitted from the light output surface is not substantially changed. When there are a plurality of directions in which the correlation length is the largest, any one of the directions may be selected.

According to the present invention, the direction in which the correlation length of the diffuse pattern in the partial area is the largest has a predetermined angular relationship with the direction along the line connecting the partial area and the light source. Therefore, the angular relationship is made the most suitable in consideration of the emission efficiency of light from the light output surface of the optical guide plate, so that it is possible to maximize the utilization efficiency, that is, the output rate of the light. When the density of the diffuse pattern elements as described later is considered, it is possible to obtain illumination which is uniform and high in luminance almost all over the surface of the optical guide plate.

The present invention further provides a structure in which the luminance distribution on the light output surface can be made uniform.

A surface light source device according to the present invention comprises an optical guide plate for confining light introduced from a light incidence surface and emitting the light outward from a light output surface, and a light source, smaller than the width of the light incidence surface of the optical guide plate, disposed on the side of the light incidence surface of the optical guide plate. A diffuse pattern is formed almost all over a surface, on the opposite side of the light output surface, of the optical guide plate. The density of the diffuse pattern is approximately zero in the vicinity of the light source.

The diffuse pattern can be not only formed by irregular processing but also provided by printing using diffuse reflective ink.

In a case where a plurality of light sources are disposed so as to face the light incidence surface of the optical guide plate, the density of the diffuse pattern is approximately zero in the vicinity of each of the light sources.

In the surface light source device using the smaller light source, as compared with the width of the light output surface of the optical guide plate, when the density of the diffuse pattern which is most suitable for the uniformity of the luminance distribution on the light output surface is considered, the density of the diffuse pattern reaches zero in the vicinity of the light source. The diffuse pattern according to the present invention is characterized in that the density of the diffuse pattern is approximately zero in the vicinity of the light source.

A surface light source device for making the luminance distribution uniform in the present invention comprises an optical guide plate for confining light introduced from a light incidence surface and emitting the light outward from a light output surface, and a light source, smaller than the width of the light incidence surface of the optical guide plate, disposed on the side of the light incidence surface of the optical guide plate. A diffuse pattern is formed almost all over a surface, on the opposite side of the light output surface, of the optical guide plate. The diffuse pattern can be provided not only by irregular processing but also printing using diffuse reflective ink. In the vicinity of the light source, {(the density of the diffuse pattern)/[(the thickness of the optical guide plate)×(the distance from the light source)]} is approximately constant. As the distance from the light source increases, {(the density of the diffuse pattern)/[(the thickness of the optical guide plate)×(the distance from the light source)]} increases.

In either one of a case where the change in the thickness of the optical guide plate is considered and a case where it is not considered, the density of the diffuse pattern is determined as described above so that the luminance distribution on the surface light source device can be made uniform.

Another surface light source device according to the present invention comprises an optical guide plate for confining light introduced from a light incidence surface and emitting the light outward from a light output surface, and a light source, smaller than the width of the light incidence surface of the optical guide plate, disposed on the side of the light incidence surface of the optical guide plate. An inclined surface is formed in the optical guide plate within a range which is not more than approximately one-half the length of the optical guide plate toward the light source from an end, which is far from the light source, of the optical guide plate such that the optical guide plate gradually thins toward the end.

The output rate of light emitted from the optical guide plate is controlled by the density of the diffuse pattern. As the distance from the light source increases, the density of the diffuse pattern increases. Beyond a certain distance, the density of the diffuse pattern is saturated, so that it is impossible to control the output rate of light by the diffuse pattern. In the surface light source device according to the present invention, the optical guide plate gradually thins toward the end far from the light source. In a thin part of the optical guide plate, the frequency at which the light is totally reflected between the light output surface of the optical guide plate and a surface opposite thereto is increased, so that the light is easily emitted from the light output surface. The luminance on the side of the end of the optical guide plate can be improved by compensating for the limit of the control of the output rate of light by the diffuse pattern by the inclined surface of the optical guide plate. A range in which the inclined surface is provided in the optical guide plate is sufficient if it is not more than approximately one-half the length of the optical guide plate. Moreover, the optical guide plate is not easily warped or cracked, thereby making it easy to fabricate and handle the optical guide plate, by providing the inclined surface within a range which is one-half the length of the optical guide plate.

Another surface light source device for making the luminance distribution uniform in the present invention comprises an optical guide plate for confining light introduced from a light incidence surface and emitting the light outward from a light output surface, and a light source, smaller than the width of the light incidence surface of the optical guide plate, disposed on the side of the light incidence surface of the optical guide plate. An inclined surface which is curved is formed on the surface of the optical guide plate such that the optical guide plate gradually thins toward an end far from the light source.

Also in the surface light source device, the inclined surface is formed in the optical guide plate such that the optical guide plate gradually thins toward the end. In a thin part of the optical guide plate, therefore, the frequency at which the light is totally reflected between the light output surface of the optical guide plate and a surface opposite thereto is increased, so that the light is easily emitted from the light output surface. The luminance on the side of the end of the optical guide plate can be improved by compensating for the limit of the control of the output rate of light by the diffuse pattern by the inclined surface of the optical guide plate. Particularly when a smaller light source, as compared with the width of the light incidence surface of the optical guide plate is used, the most suitable shape can be obtained by taking the inclined surface as a curved surface, thereby making the luminance distribution in the surface light source device uniform.

Still another surface light source device according to the present invention comprises an optical guide plate for confining light introduced from a light incidence surface and emitting the light outward from a light output surface, and a light source, smaller than the width of the light incidence surface of the optical guide plate, disposed on the side of the light incidence surface of the optical guide plate. An inclined surface is formed on the light output surface of the optical guide plate such that the optical guide plate gradually thins toward an end far from the light source.

Since the diffuse pattern is generally formed on the surface, on the opposite side of the light output surface, of the optical guide plate, it is possible to simplify the structure of the optical guide plate and to made the formation of the optical guide plate easy by providing the inclined surface for decreasing the thickness of the optical guide plate on the light output surface of the optical guide plate. Consequently, the structure of a metal mold for forming the optical guide plate is also simplified.

A further surface light device according to the present invention comprises an optical guide plate for confining light introduced from a light incidence surface and emitting the light outward from a light output surface, and a light source, smaller than the width of the light incidence surface of the optical guide plate, disposed on the side of the light incidence surface of the optical guide plate. Inclined surfaces are respectively formed in the vicinities of three sides excluding a side, on which the light incidence surface is positioned, of the optical guide plate such that the optical guide plate gradually thins toward its edge.

In the surface light source device using the smaller light source, as compared with the width of the light incidence surface of the optical guide plate, light is also emitted toward the oblique direction. Correspondingly, the density of the diffuse pattern may be saturated even on both sides of the optical guide plate. The optical guide plate thins toward the edge in the vicinity of the three sides, excluding the side on which the light incidence surface is positioned, of the optical guide plate, so that the output rate of at edges of the three sides, excluding the side on which the light incidence surface is positioned, of the optical guide plate can be increased, and the luminance distribution in the surface light source device can be made uniform. Consequently, it is possible to obtain an effect inherent in the surface light source device using the smaller light source, as compared with the width of the light incidence surface.

Preferably, in the above-mentioned surface light source device, an inclined surface is also formed at a corner of the optical guide plate.

When the smaller light source, as compared with the width of the light incidence surface of the optical guide plate is used, the density of the diffuse pattern is easily saturated at a corner of the optical guide plate. The light output efficiency at the corner of the optical guide plate can be increased by forming the inclined surface at the corner. It is possible to increase the output efficiency of light emitted from the corner of the optical guide plate which is farthest from the light source and is liable to be darkened. It is possible to prevent the luminance at the corner of the optical guide plate from being decreased, to make the luminance distribution on the optical guide plate uniform.

More preferably, in the above-mentioned surface light source device, the inclined surface does not reach an end of the optical guide plate, that is, an end of the optical guide plate has the same thickness as that of a portion where the inclined surface of the optical guide plate is not provided.

Since the inclined surface for thinning the optical guide plate does not reach the end of the optical guide plate, the optical guide plate itself or a member set on the optical guide plate can be stabilized.

A surface light source device according to the present invention which realizes high luminance comprises an optical guide plate for confining light introduced from a light incidence surface and emitting the light outward from a light output surface, and a light source, smaller than the width of the light incidence surface of the optical guide plate, disposed on the side of the light incidence surface of the optical guide plate. A return reflecting portion having two sides at an angle of approximately 45° to the direction along the line connecting each of the sides and the light source is provided on an outer peripheral surface of the optical guide plate or in the vicinity of the outer peripheral surface.

When a so-called point light source is once disposed in the optical guide plate, the direction of light directly reaching the return reflecting portion from the light source is determined. The return reflecting portion having two sides at an angle of approximately 45° to the direction along the line connecting each of the sides and the light source is provided on an outer peripheral surface of the optical guide plate or the vicinity of the outer peripheral surface, so that the light from the light source can be totally reflected from the return reflecting portion. Light from a relatively weak light source which has reached the outer peripheral surface of the optical guide plate or the vicinity of the outer peripheral surface can be reflected toward the original direction, so that it is possible to eliminate the possibility that the light in the optical guide plate leaks outward from the outer peripheral surface of the optical guide plate, resulting in loss. As a result, the luminance of the surface light source device can be increased by decreasing the loss of the leakage of the light emitted from the point light source.

Preferably, the two sides constituting the return reflecting portion have an equal length.

Since the two sides of the return reflecting portion have an angle of approximately 90° and have an equal length, almost all of light beams totally reflected from one of the sides of the return reflecting portion can be also totally reflected from the other side, so that the luminance of the surface light source device can be increased upon reflecting the light from the light source in the original direction so as not to leak from the outer peripheral surface of the optical guide plate.

A part of the optical guide plate is cut, if necessary and the return reflecting portion is formed on an inner surface of the cut part of the optical guide plate.

Even when the return reflecting portion cannot be provided on the outer peripheral surface of the optical guide plate, it is possible to decrease the leakage of the light and to increase the luminance of the surface light source device by providing the return reflecting portion inside the optical guide plate.

A liquid crystal display device according to the present invention comprises a liquid crystal display panel for producing an image and the above-mentioned surface light source device for lighting the liquid crystal display panel.

In the liquid crystal display device, the liquid crystal display panel is lighted by the surface light source device according to the present invention, so that an image display surface of the liquid crystal display device can be brightened, and the variation in the luminance of an image can be decreased.

A portable telephone according to the present invention comprises a display section including the above-mentioned liquid crystal display device.

An information terminal according to the present invention comprises a display section including the above-mentioned liquid crystal display device.

Also in the portable telephone and the information terminal, it is possible to obtain a display surface which is bright and is uniform in the luminance distribution.

BRIEF DESCRIPTION OF DRAWINGS

FIG. 15a is a perspective view, and FIG. 15b is a bottom view;

FIGS. 29a and 29b are diagrams for explaining the relationship between the thickness of an optical guide plate and the quantity of output light;

FIG. 30 is a graph showing the relationship between the thickness of an optical guide plate and the quantity of output light;

BEST MODE FOR CARRYING OUT THE INVENTION

First Embodiment

Figure 1:
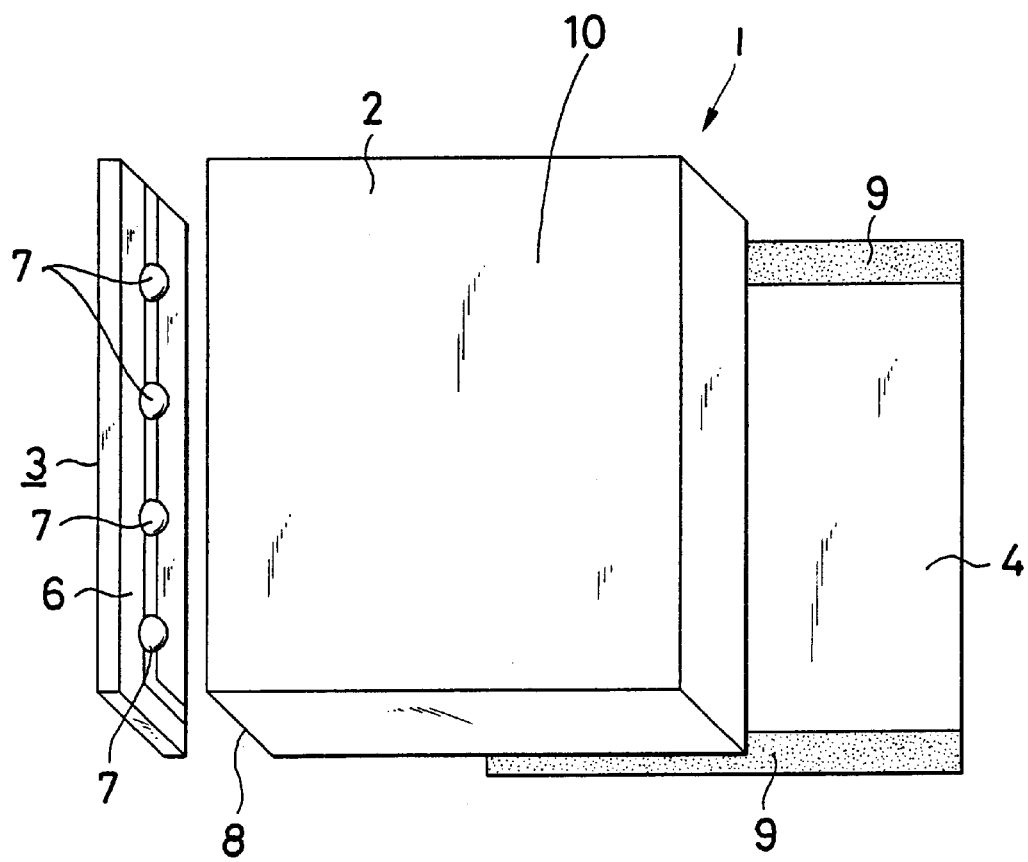
FIG. 1 is an exploded perspective view showing a conventional surface light source device using a point light source.
Figure 2:
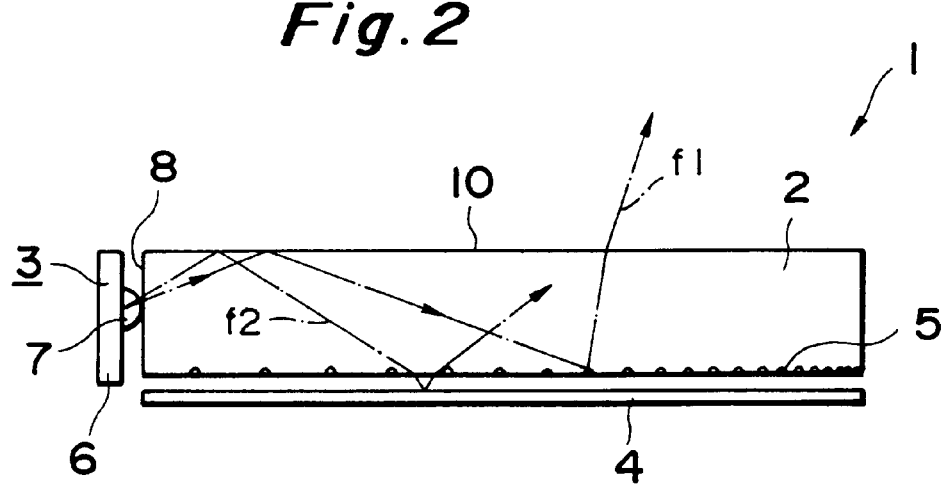
FIG. 2 is a cross-sectional view of a conventional surface light source device, which together shows how light in an optical guide plate in the surface light source device propagates.
Figure 3:
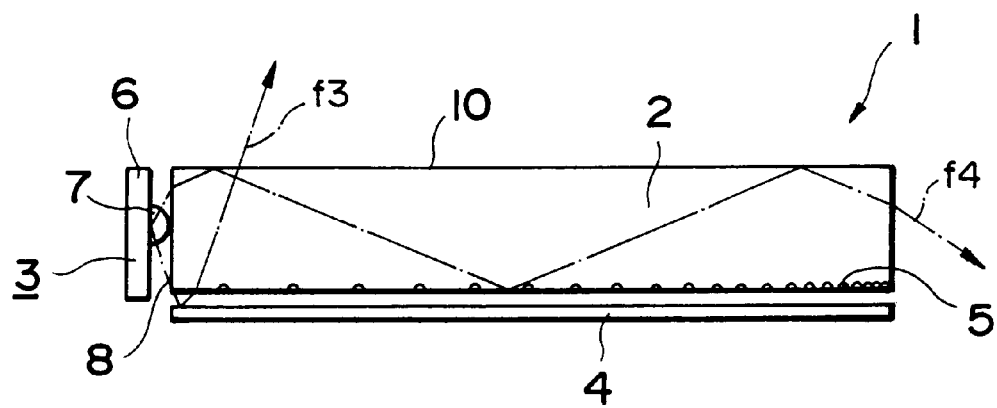
FIG. 3 illustrates another example in which light propagates in the conventional surface light source device.
Figure 4:
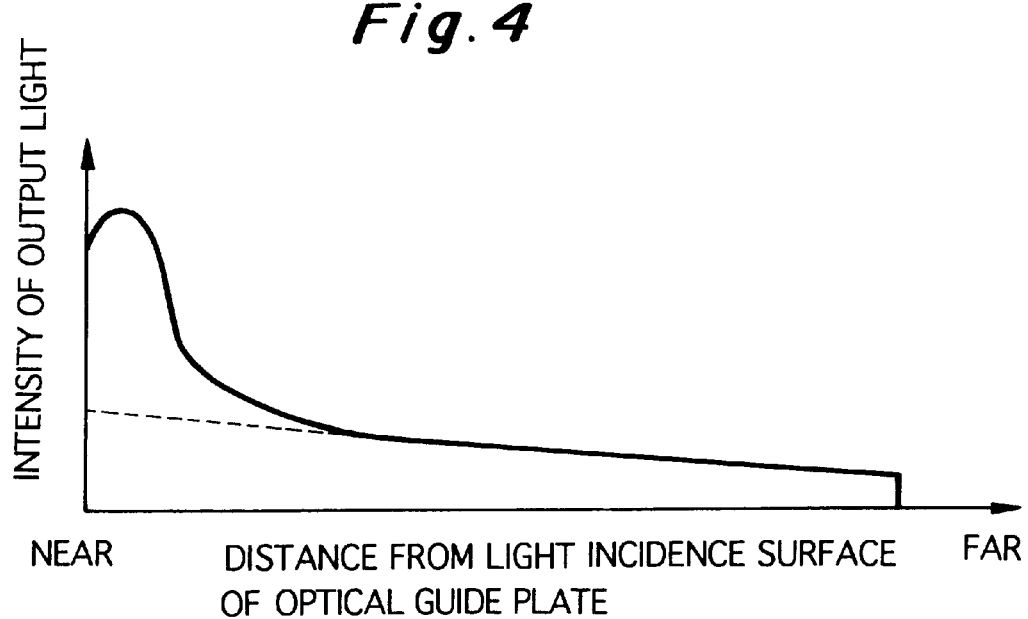
FIG. 4 is a graph showing the distribution of the intensity of light emitted from a light output surface in the conventional surface light source device.
Figure 5:
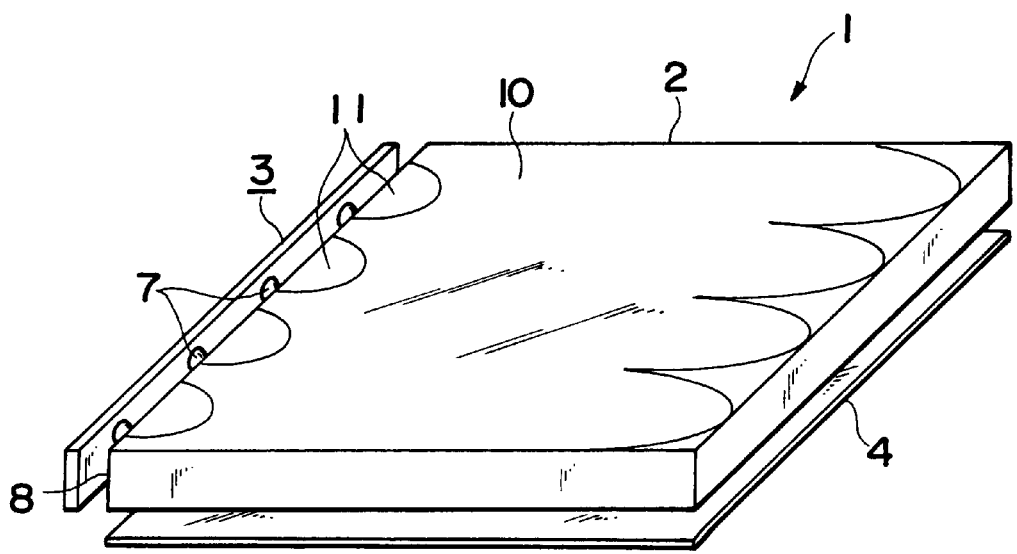
FIG. 5 is a perspective view showing the non-uniformity of the luminance distribution in the conventional surface light source device.
Figure 6:
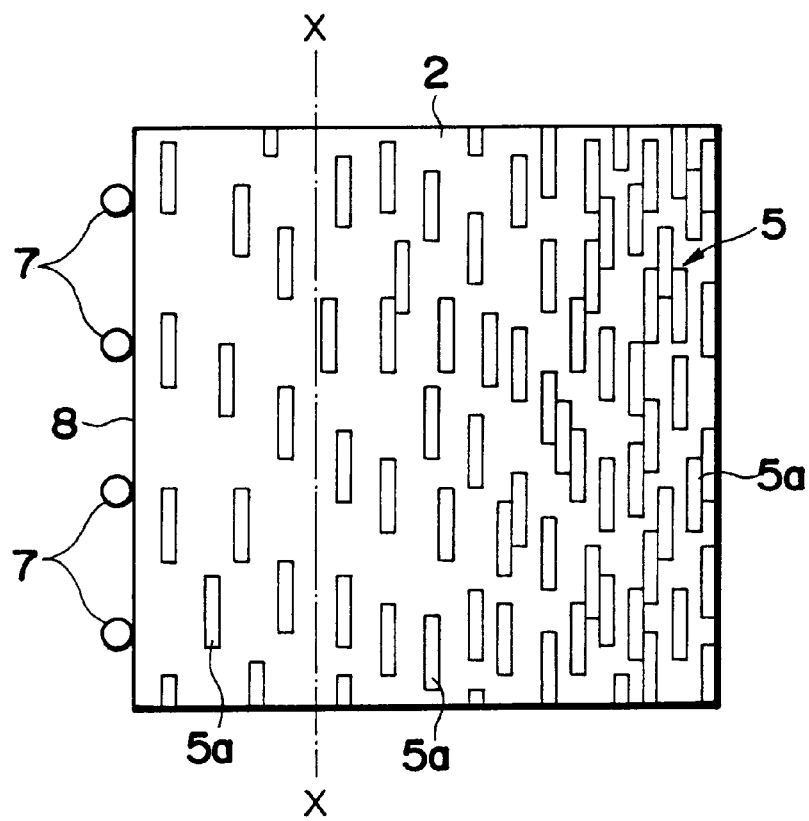
FIG. 6 is a bottom view of an optical guide plate showing a diffuse pattern in the conventional surface light source device.
Figure 7:
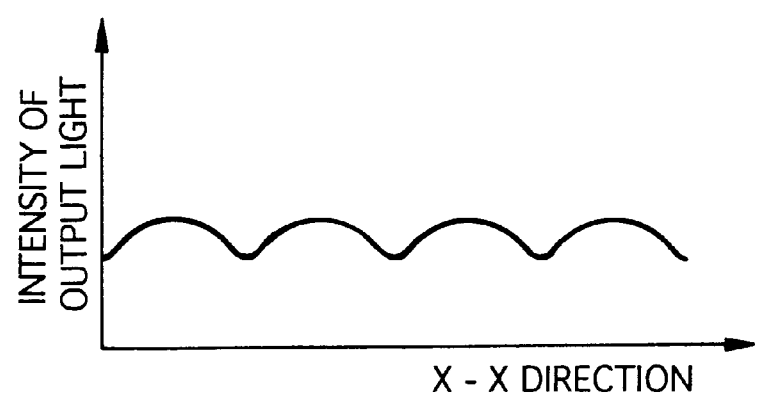
FIG. 7 is a graph showing the distribution of the intensity of output light along the width of the conventional surface light source device (a direction X—X in FIG. 6)
Figure 8:
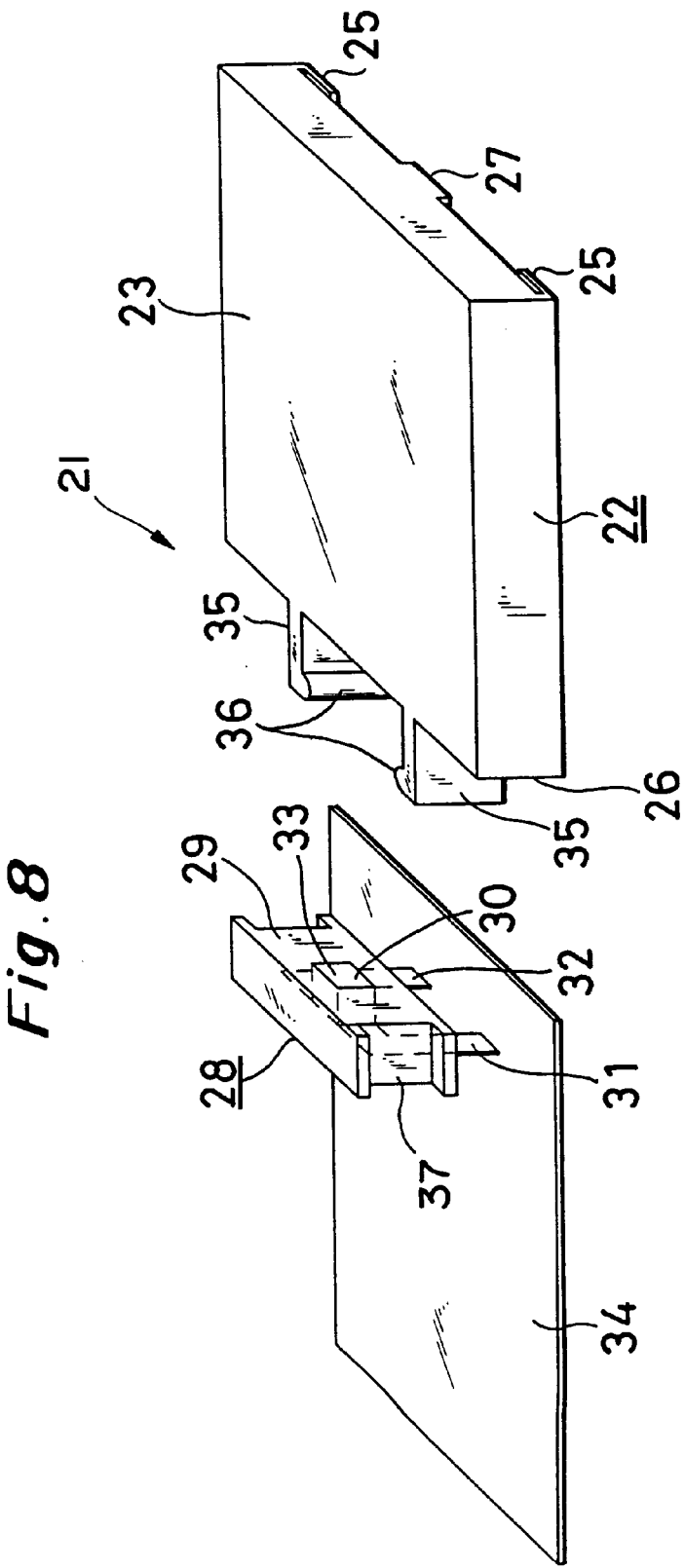
FIG. 8 is an exploded perspective view showing a surface light source device according to a first embodiment of the present invention.

FIG. 8 is an exploded perspective view showing a surface light source device according to a first embodiment of the present invention. The upper surface of an optical (wave) guide plate 22 formed of a transparent resin material such as polycarbonates (having an index of refraction of 1.52) or acrylics (having an index of refraction of 1.492) serves as a light output surface 23, and a diffuse pattern 24 (see FIG. 9) is formed by irregular processing on the lower surface thereof. The diffuse pattern 24 can be also formed by dot printing of diffuse reflective ink. In this case, the diffuse pattern is generally printed with use of diffuse reflective ink on the surface of a sheet or a plate-shaped member (which is preferably transparent), and this printed surface is tightly bonded to the lower surface of the optical guide plate 22. Reflecting plate holding portions 25 are provided on both sides of the lower surface of the optical guide plate 22, and grooves which both the sides of a reflecting plate 34 respectively enter are formed between the lower surface of the optical guide plate 22 and the holding portions 25. A stopper 27 protrudes downward from an end surface, on the opposite side of a light incidence surface 26, of the optical guide plate 22.

A point light source 30 is realized by a light emitting device chip (for example, a light emitting diode (LED) chip). Two lead terminals 31 and 32 in an L shape are spaced apart from each other. The light emitting device chip is die-bonded to a crooked end of the one lead terminal 31, and the light emitting device chip and a crooked end of the other lead terminal 32 are connected to each other by a bonding wire. The light emitting device chip and the upper halves of the lead terminals 31 and 32 are molded in transparent sealing resin 33. The point light source 30 can be also realized by a miniature electric bulb or the like. The point light source 30 is molded by white opaque sealing resin 29 having a high index of reflection, thereby constituting a light emitting device 28. A surface, on the side of light emission, of the point light source 30 is exposed from the opaque sealing resin 29. Consequently, light emitted by the point light source 30 is outputted from its front surface. Lower ends of the lead terminals 31 and 32 also protrude downward from the opaque sealing resin 29. Light mainly emitted sideward (also partly rearward) from the light emitting device chip is returned to the point light source 30 upon being reflected from the interface between the transparent sealing resin 33 and the opaque sealing resin 29, so that the light can be effectively utilized.

The reflecting plate 34 is formed of a material having a high index of surface reflection, for example, a white plastic sheet which is hard or relatively soft. Both sides of the reflecting plate 34 are respectively inserted into the grooves between the lower surface of the optical guide plate 22 and the reflecting plate holding portions 25, so that the reflecting plate 34 is held on the lower surface of the optical guide plate 22. A reflective film or layer (including a diffuse pattern) may be formed throughout the lower surface of the optical guide plate 22 in place of providing the reflecting plate 34. When the diffuse pattern element is realized by a recess as described later, the reflective film may be formed on only an inner surface of the recess.

A pair of elastic holding members 35 is integrally formed on the light incidence surface 26 of the optical guide plate 22, and extends outward perpendicularly from the light incidence surface 26. Engaging claws 36 protruding inward are respectively formed at ends of both the elastic holding members 35. On the other hand, depressions 37 are formed on both side surfaces of the opaque sealing resin 29. The light emitting device 28 is inserted between the elastic members 35, and is embraced by the elastic members 35 such that the elastic members 35 are arranged in the depressions 37 on both the side of the device 28. The engaging claws 36 of the elastic members 35 are engaged with the rear surface of the light emitting device 28, so that the light emitting device 28 is so held as not to slip off.

Figure 9:
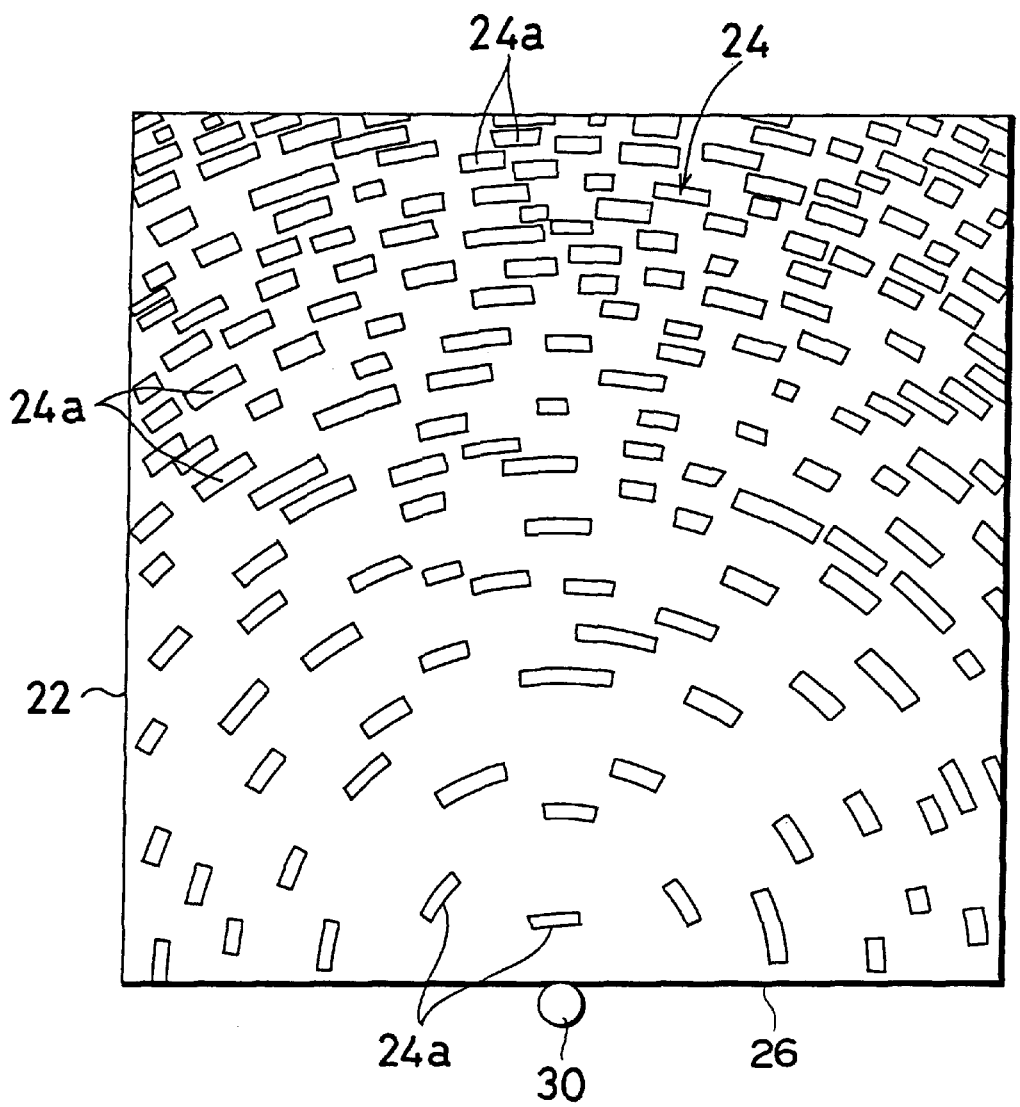
FIG. 9 is a bottom view showing a diffuse pattern formed on an optical guide plate in the surface light source device.

FIG. 9 is a bottom view showing the diffuse pattern 24 formed on the lower surface of the optical guide plate 22. As described above, the point light source 30 (or the light emitting device 28) is mounted on the optical guide plate 22 in a state where its light output surface is in contact with the light incidence surface 26 of the optical guide plate 22. The light emitted from the point light source 30 is introduced into the optical guide plate 22, and is propagated by total reflection while being spread radially around the point light source 30 in the optical guide plate 22. The diffuse pattern 24 formed on the optical guide plate 22 includes a lot of diffuse pattern elements 24a, and the diffuse pattern elements 24a are arranged concentrically around the point light source 30 in correspondence with the light propagating while being radially spread. When the diffuse pattern 24 is viewed as a whole, the spacing between the adjacent diffuse pattern elements 24a narrows as the distance from the point light source 30 increases, and the density of existence of diffuse pattern elements gradually increases as the distance from the point light source 30 increases. When the diffuse pattern 24 is viewed in a relatively narrow range, the arrangement of the diffuse pattern elements 24a is approximately random.

Figure 10:
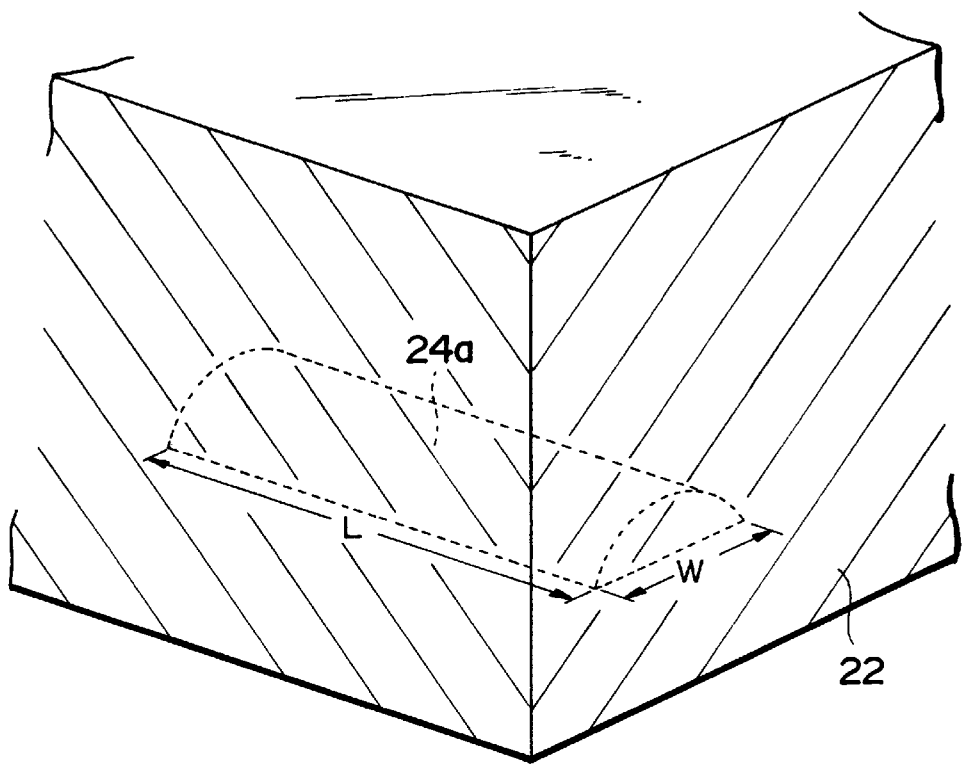
FIG. 10 is a perspective view showing an example of a diffuse pattern element constituting a diffuse pattern.
Figure 11:
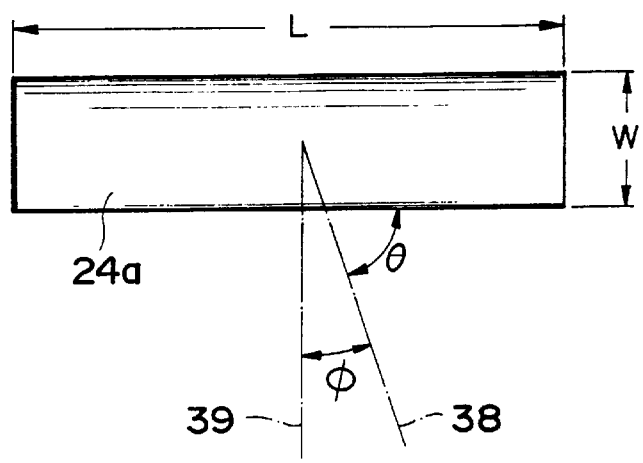
FIG. 11 is a view showing the diffuse pattern element as viewed from the lower surface of the optical guide plate.

FIGS. 10 and 11 illustrate an example of the diffuse pattern element 24a. The diffuse pattern element 24a is realized by a recess (a concave portion) formed on the lower surface of the optical guide plate 22. The recess is a rectangle (its long side may be gently curved in an arc shape) viewed from the lower surface of the optical guide plate 22, and has a curved inner surface (such a shape that a semi-circle is slightly crushed) when the cross section thereof in a direction along the width thereof (a direction perpendicular to a direction along the length thereof) is viewed. The direction along the length of the diffuse pattern element 24a is referred to as the direction of arrangement thereof. The length L of the diffuse pattern element 24a is not less than twice the width W thereof (L≧2W). All the diffuse pattern elements 24a are arranged such that the direction of arrangement thereof is at an approximately constant angle θ with a direction 38 along the line connecting the diffuse pattern element 24a and the point light source 30. Particularly in the diffuse pattern 24 shown in FIG. 9, the direction 38 along the line connecting the diffuse pattern element 24a and the point light source 30 and the direction of arrangement of the diffuse pattern elements 24a are approximately perpendicular to each other (θ≈90°).

Of the light beams emitted from the point light source 30 and propagated while being totally reflected between the upper surface (the light output surface 23) and the lower surface (a surface where the diffuse pattern 24 is formed) in the optical guide plate 22, some light beams impinge on a peripheral surface, which is in an arc shape in cross section, of the diffuse pattern element 24a. Further some light beams are reflected from the peripheral surface of the diffuse pattern element 24a (boundary surface reflection or total reflection), and the other light beams are directed toward the reflecting plate 34 upon passing through the peripheral surface of the diffuse pattern element 24a.

Consider the light propagating in the optical guide plate 22 and the diffuse pattern elements 24a in a plane parallel to the upper surface or the lower surface of the optical guide plate 22. It may be said that FIG. 11 is a diagram showing the plane as viewed from above. A normal line 39 of the diffuse pattern element 24a is perpendicular to the length direction of the element 24a.

Figure 12:
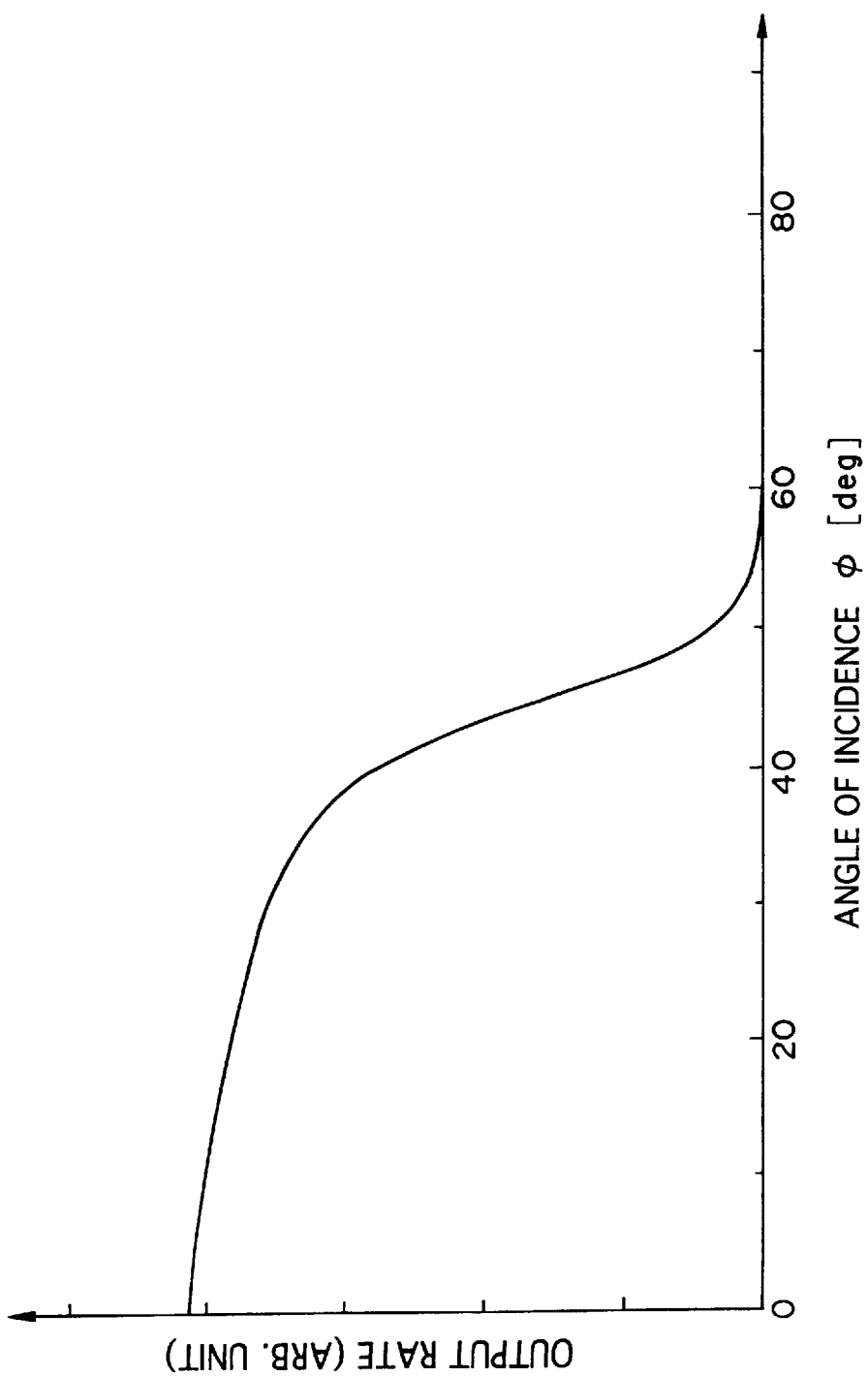
FIG. 12 is a graph showing the relationship between the angle of incidence to the diffuse pattern element and the output rate of light.

FIG. 12 is a graph showing the relationship between an angle of incidence φ of light incident on the diffuse pattern element 24a and the output rate. Light beams propagating in the optical guide plate 22 propagate at various angles within an angle range defined by the critical angle in total reflection, and are incident on various portions on the peripheral surface in an arc shape of the diffuse pattern element 24a at various angles, as viewed in a cross section perpendicular to the optical guide plate 22. It should be understood that the graph in FIG. 12 shows the average value of such various light beams. FIG. 12 represents the behavior of light as viewed from a plane (shown in FIG. 11).

The angle of incidence φ of light is an angle of incidence φ of light with respect to a direction along the normal line 39 of the diffuse pattern element 24a serving as a basis, where the relationship of φ=90°−θ exists. The output rate of light refers to the ratio [%] of light beams emitted from the light output surface 23 to the light beams impinging on the diffuse pattern element 24a.

A lot of light beams reflected from the diffuse pattern element 24a of the light beams whose angle of incidence φ is close to 0° are directed vertically upward or toward the vicinity thereof, so that the angle of incidence on the light output surface 23 is small. Consequently, these light beams are emitted outward upon passing through the light output surface 23. The light beams whose angle of incidence φ is close to 90° are approximately equivalent to light beams incident on the lower surface of the optical guide plate 22. Even if such light beams are directed toward the light output surface 23 upon being reflected from the diffuse pattern element 24a, the angle of incidence thereof is small (exceeding the critical angle in total reflection), so that the light beams are neither totally reflected from the light output surface 23, nor emitted outward. Consequently, the ratio of the light beam emitted from the light output surface 23 upon being reflected from the diffuse pattern element 24a is large in the vicinity of φ=0°, while being zero in the vicinity of φ=90°. The output rate of emission rapidly changes in the vicinity of an angle defined by the critical angle in total reflection between φ=0° and φ=90°.

Of the light beams incident on the diffuse pattern element 24a, the light beams passing through the diffuse pattern element 24a are reflected from the reflecting plate 34 upon being outputted from the optical guide plate 22, and is returned to the optical guide plate 22 again. These light beams are always emitted toward the outside of the optical guide plate 22 from the light output surface 23. The nearer the angle of incidence φ is to 0°, the larger the number of light beams passing through the diffuse pattern element 24a is. When the angle of incidence φ of light is 90°, the light does not pass through the diffuse pattern element 24a. Consequently, the ratio of the light beams reflected from the reflecting plate 34 upon passing through the diffuse pattern element 24a, returned to the optical guide plate 22 again, and emitted outward from the light output surface 23 is also large in the vicinity of φ=0°, while being zero in the case of φ=90°.

The light beams reflected from the diffuse pattern element 24a and the light beams transmitting therethrough thus exhibit similar tendencies. As a whole, the output rate is high in a range in which the angle of incidence φ is small, while rapidly decreasing to finally become zero when the angle of incidence φ increases, as shown in FIG. 12. The graph shown in FIG. 12 can be evaluated as follows. That is, the output rate is kept approximately constant in a range where the angle of incidence φ is 0° to 30°, is decreased in a range where the angle of incidence φ is 30° to 40°, and is further rapidly decreased in a range where the angle of incidence φ is 40° to 50°.

A high output rate can be obtained by setting the direction of arrangement of the diffuse pattern element 24a in the range of θ=60° to 90° from the foregoing reasons, so that the high luminance of the surface light source device 21 can be obtained. Particularly, the best output rate characteristics can be obtained by setting the direction of arrangement of the diffuse pattern element 24a to a direction approximately perpendicular to a direction along the line connecting the diffuse pattern element 24a and the point light source 30 (θ≈90°), so that the luminance of the surface light source device 21 can be increased. Moreover, even if there is a variation of approximately ±30° in the direction of arrangement of the diffuse pattern element 24a, the output rate is hardly decreased, so that high luminance can be maintained.

In the diffuse pattern element 24a having a curved surface as shown in FIG. 10, light beams incident on the curved surface are reflected almost uniformly over a wide range, and are incident on the light output surface 23 at various angles of incidence. Since the positions where the light beams are emitted in the light output surface 23 are widely dispersed, therefore, this contributes to the uniformity of the quantity of output light throughout the optical guide plate 22.

Figure 13:
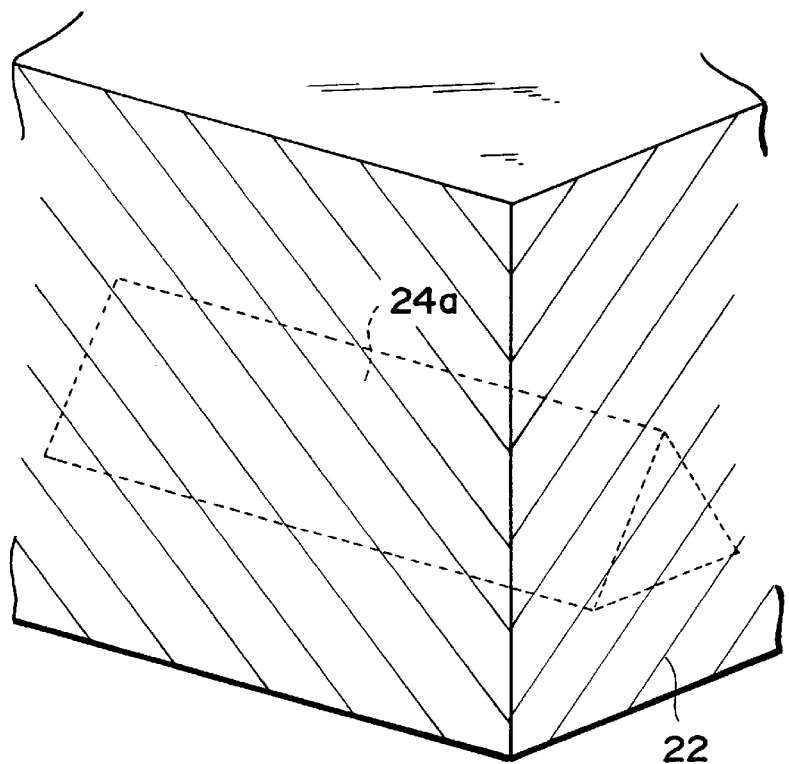
FIG. 13 is a perspective view showing another example of the diffuse pattern element.
Figure 14A:
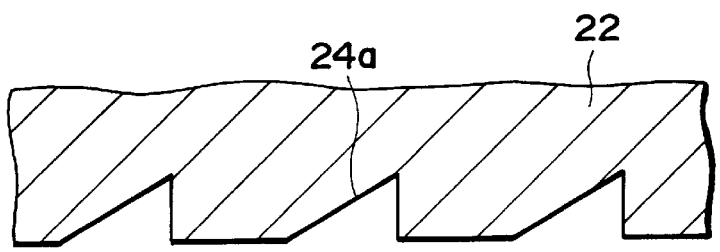
FIGS. 14a and 14b are cross-sectional views showing an examples of the cross sections of diffuse pattern elements having a triangular cross section.
Figure 14B:
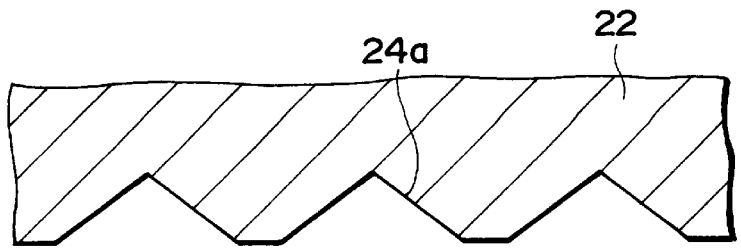

The diffuse pattern element 24a is not limited to that in the above-mentioned example. Diffuse pattern elements in various shapes can be listed in addition thereto. FIG. 13 illustrates a diffuse pattern element 24a which is triangular in cross section. Typical examples of the diffuse pattern element 24a which is triangular in cross section include a diffuse pattern element 24a which is in the shape of a right angled triangle in cross section as shown in FIG. 14a and a diffuse pattern element 24a which is in the shape of an isosceles triangle in cross section as shown in FIG. 14b.

In the diffuse pattern element 24a which is in the shape of a right angled triangle in cross section (FIG. 14a), the density of the diffuse pattern elements can be increased because an unnecessary oblique plane is omitted, so that the rate output of light can be increased. In the diffuse pattern element 24a which is in the shape of an isosceles triangle in cross section (FIG. 14b), not only light incident on the diffuse pattern 24 from the side of the point light source 30 but also light incident on the diffuse pattern 24 from the opposite side of the point light source 30 upon being reflected from a return reflecting plate, a reflecting plate (described later) or the like provided in an end surface or a side surface of the optical guide plate 22 can be emitted from the light output surface 23 by the diffuse pattern element 24a, so that the output rate of the light can be increased.

Figure 15A:
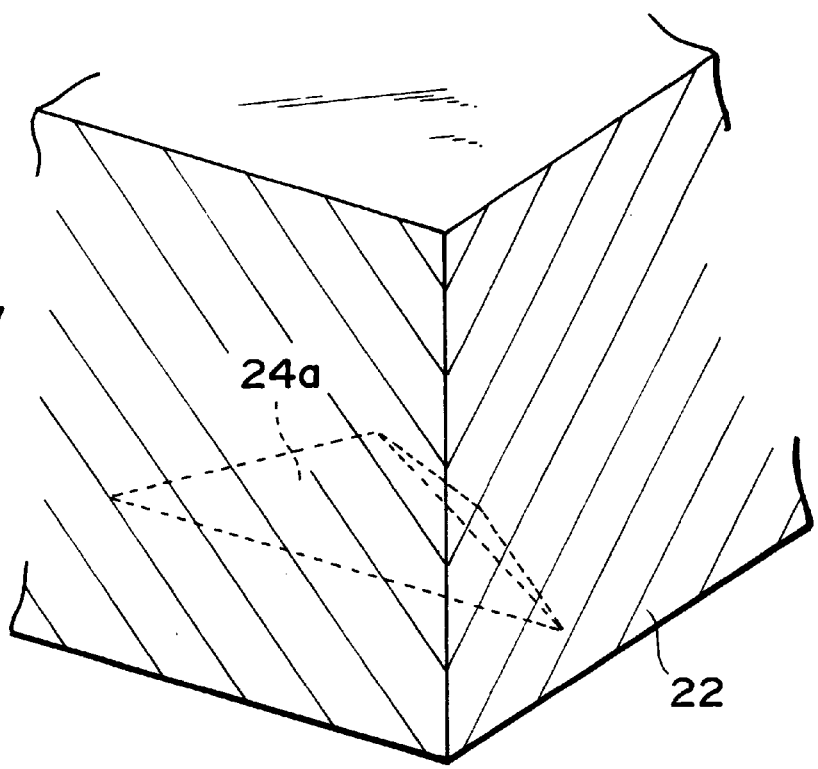
FIGS. 15a and 15b illustrate another example of a diffuse pattern element, where
Figure 15B:
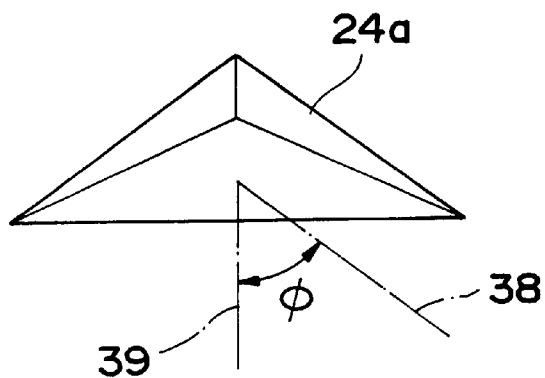

FIGS. 15a and 15b illustrate a diffuse pattern element 24a which is realized by a recess in the shape of a triangular pyramid. An angle of incidence φ on the diffuse pattern element 24a can be defined using as a basis a normal line 39 on an oblique plane directed toward the point light source 30.

Figure 16:
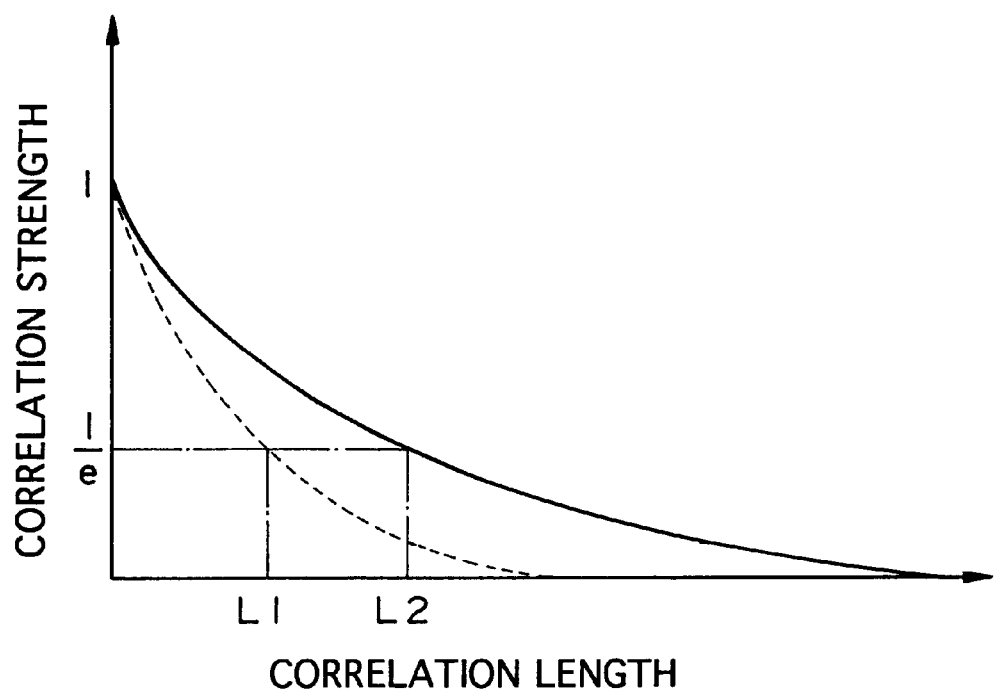
FIG. 16 is a graph for explaining the correlation length of a diffuse pattern.

In cases such as a case where the shape of the diffuse pattern element 24a is random, the direction of arrangement of the diffuse pattern element 24a can be defined on the basis of the correlation length of the diffuse pattern 24. FIG. 16 is a graph showing the relationship between the correlation length and the correlation strength in two directions (a solid line and a broken line). A value at a point where the correlation strength is 1/e (e is the base of the natural logarithm) of its maximum value (1) is defined as a correlation length of the diffuse pattern. A correlation length L2 of the diffuse pattern in the direction shown in the graph indicated by the solid line is longer than a correlation length L1 of the diffuse pattern in the direction shown by the graph indicated by the broken line. The output rate of light can be increased by setting the direction in which the correlation length is the longest within the range of a predetermined angle with respect to the direction toward the light source, preferably by setting the direction in which the correlation length is the longest to a direction approximately perpendicular to the direction toward the light source, so that the luminance of the surface light source device 21 can be increased.

Description is made of the density distribution of the diffuse pattern in which uniform luminance can be obtained throughout the optical guide plate 22 in a case where the point light source 30 is used.

Figure 17A:
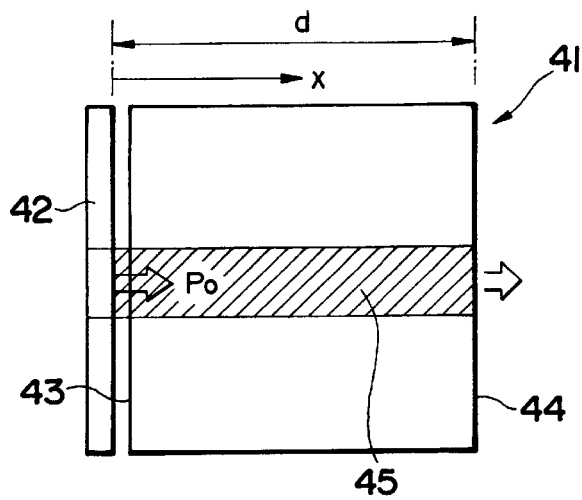
FIGS. 17a to 17d are diagrams for explaining the principle for determining the density of diffuse pattern elements in a surface light source device having a linear light source.

First referring to FIGS. 17a and 17b for comparison, a surface light source device 41 using a linear light source 42 will be described. In the case of the linear light source 42, it may be considered that the quantity of light emitted from the linear light source 42 is uniform in a direction parallel to a light incidence surface 43, so that only a portion in a unit width of the light incidence surface 43 shall be an object of consideration, as hatched in FIG. 17a. Let d be the length from the linear light source 42 to an end of an optical guide plate 44, x be the distance from the linear light source 42, and $P_0$ be the quantity of light introduced per unit width into the optical guide plate 44 from the linear light source 42. Further, the luminance of a light output surface 45 of the optical guide plate 44 is uniform. Light whose light quantity is constant, i.e., $Q=P_0/D$ per unit length of the light output surface 45 shall be emitted (the light quantity Q is referred to as the quantity of output light). In order to make the quantity of output light from the light output surface 45 of the optical guide plate 44 uniform, it is considered that useless light emitted from an end surface, on the opposite side of the linear light source 42, of the optical guide plate 44 will be required. Let D be the virtual distance at which the useless light propagates while being emitted from the light output surface so that the quantity of the light will be finally zero.

Figure 17B:
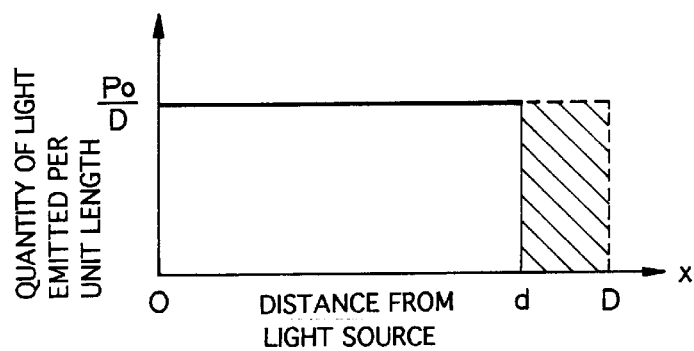

A graph of the light quantity Q of light outputted per unit length is shown in FIG. 17b. Since light whose light quantity is $P_0$ (d/D) is emitted from the whole of the light output surface 45, the remaining quantity of light $P_0$ (1−d/D) is the quantity of useless light outputted from an end surface of the optical guide plate 44 (a portion indicated by hatching).

Figure 17C:
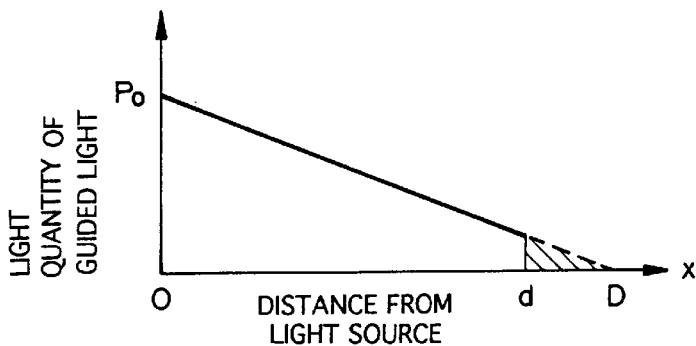

Consider the light quantity S of light passing through a cross section, at a position spaced a distance x apart from the linear light source 42, of the optical guide plate 44. Since light whose light quantity is $P_0$ (x/D) is emitted from the light output surface 45 until the light reaches the cross section spaced the distance x apart from the linear light source 42, the light quantity S of light passing through the cross section spaced the distance x apart is $P_0$ (1−x/D). The light quantity S is referred to as the quantity of guided light, and a graph thereof is shown in FIG. 17c. Letting ρ be the output rate, the light quantity Q of output light is expressed by Q=ρS. In order to set the light quantity Q of emitted light to a predetermined value $P_0$/D as shown in FIG. 17b, therefore, the output rate may be as follows:

$$\rho = Q/S = 1/(D-x) \quad (1)$$

Figure 17D:
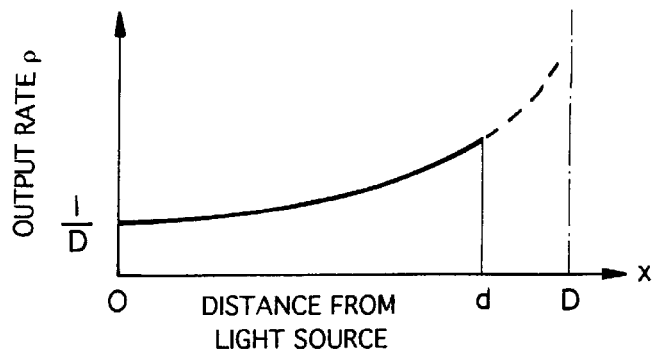

The output rate ρ is shown in FIG. 17d. The output rate is ρ=1/D at the position x=0 of the linear light source 42. In the surface light source device using the linear light source, the output rate has a limited value other than zero at the position of the linear light source 42.

Referring to FIGS. 18a to 18d, description is now made of the surface light source device using the point light source 30.

Figure 18A:
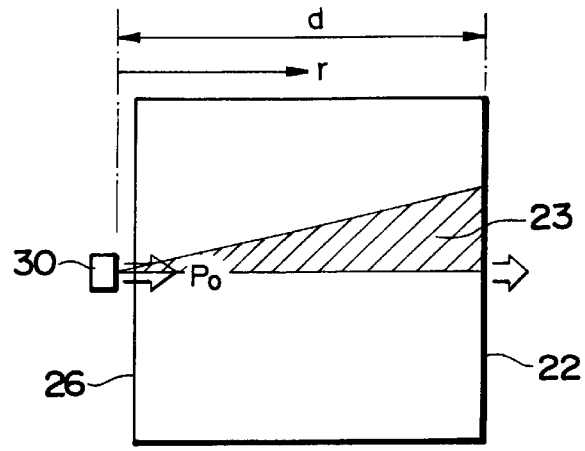
FIGS. 18a to 18d are diagrams for explaining the principle for determining the density of diffuse pattern elements in a surface light source device having a point light source.

In the case of the point light source 30, light emitted from the point light source 30 is radially spread, so that only light discharged per unit angle, as indicated by hatching in FIG. 18a, may be considered. Let d be the length from the point light source 30 to an end of the optical guide plate 22, r be the distance from the point light source 30, and Po be the quantity of light introduced per unit angle from the point light source 30 to the optical guide plate 22. When it is assumed that the luminance on the light output surface 23 of the optical guide plate 22 is uniform, the quantity of light emitted per unit length of the light output surface 23 is proportional to the distance r, which is replaced with $Q=2P_0 \cdot r/R^2$. R denotes a virtual distance corresponding to the above-mentioned distance D.

Figure 18B:
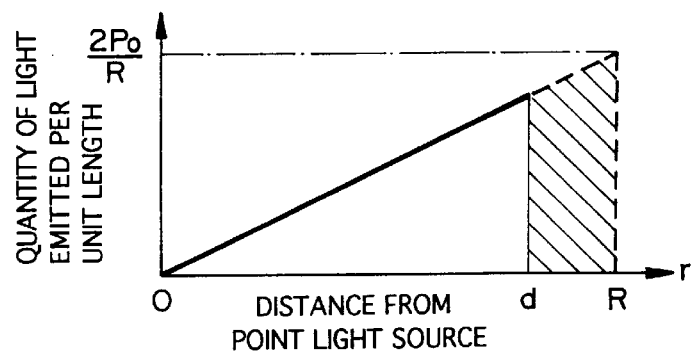

A graph of the quantity of light outputted per unit length is shown in FIG. 18b. Since light whose light quantity is $P_0(d/R)^2$ is emitted from the whole of the light output surface 23, the remaining quantity of light $P_0[1-(d/R)^2]$ is the quantity of useless light outputted from an end surface of the optical guide plate 22 (a portion indicated by hatching in FIG. 18b).

Figure 18C:
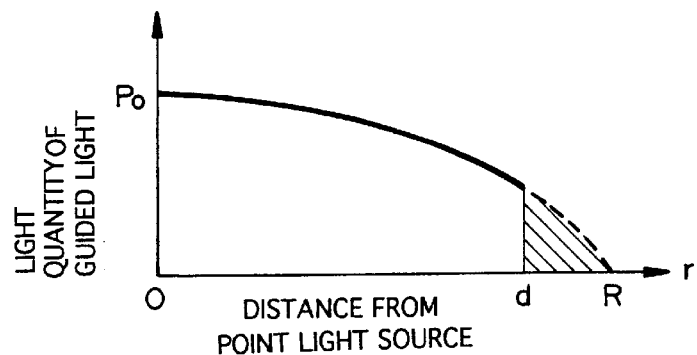

Consider the light quantity S of guided light passing through a cross section, at a position spaced the distance r apart from the point light source 30, of the optical guide plate 22. Since light whose light quantity is $P_0$ $(r/R)^2$ is emitted from the light output surface 23 until the light reaches the cross section spaced the distance r apart from the linear light source 30, the light quantity S of guided light passing through the cross section spaced the distance r apart is $P_0[1-(r/R)^2]$. A graph of the light quantity S of guided light is shown in FIG. 18c. Letting ρ be the output rate, the light quantity Q of output light is expressed by Q=ρS. In order to set the light quantity Q of output light to $Q=2P_0r/R^2$ as previously described, therefore, the output rate may be as follows;

$$\rho = Q/S = 2 \cdot (R^2 - r^2) \quad (2)$$

Figure 18D:
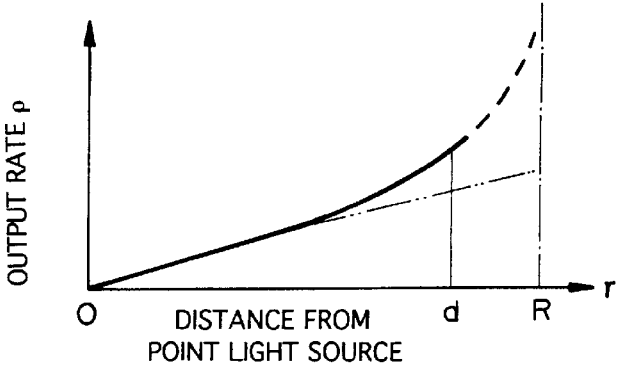

The output rate ρ is shown in FIG. 18d. A significant feature is ρ=0 at the position r=0 of the point light source 30 (compare the case of the linear light source). The output rate ρ can be approximated by the following value in the vicinity of the point light source 30:

$$\rho \approx 2 \cdot r/R$$

Therefore, the output rate ρ linearly increases with the distance r.

The output rate at the position of the light source significantly differs between the linear light source and the point light source. In the surface light source device using the point light source 30, the output rate at the position of the point light source 30 is zero, while linearly increasing with the distance r in the vicinity of the point light source 30.

Figure 19:
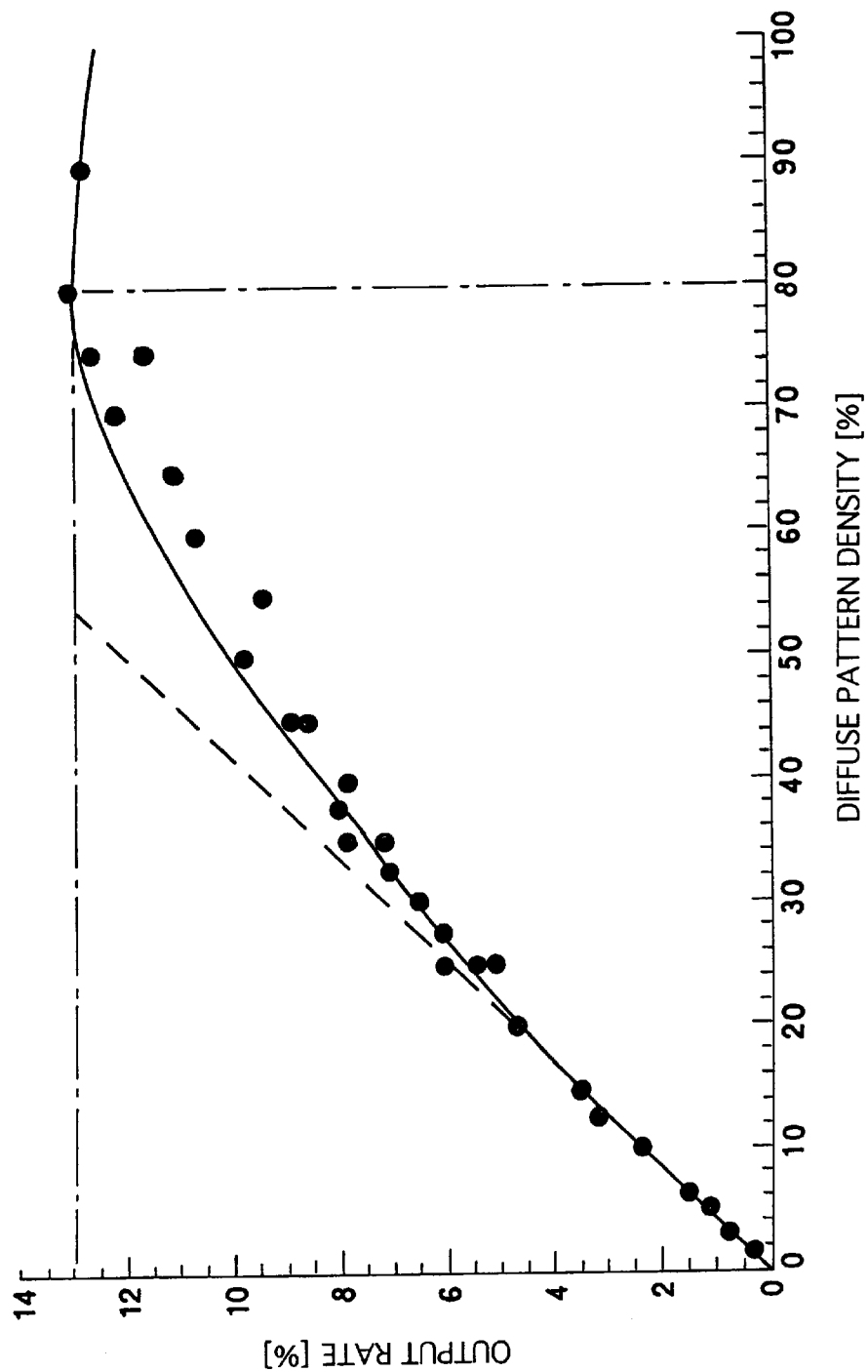
FIG. 19 is a graph showing the relationship between the density of diffuse pattern elements and the output rate.

There is a relationship as shown in FIG. 19 between the output rate ρ and the density of the diffuse pattern elements. Particularly in a range in which the density of the diffuse pattern elements is small, there is an approximately linear relationship between the density of the diffuse pattern elements and the output rate ρ. Consequently, the description of the output rate is also almost true for the density of the diffuse pattern elements. That is, when the linear light source 42 is used, the relationship expressed by the equation (1) almost holds with respect to the density of the diffuse pattern elements. On the other hand, when the point light source 30 is used, the relationship expressed by the equation (2) also almost holds with respect to the density of the diffuse pattern elements, similarly to the output rate ρ. That is, the output rate ρ can be replaced with the density of the diffuse pattern elements in the equation (2). The density of the diffuse pattern elements is zero at the position of the point light source 30, while linearly increasing with the distance r in the vicinity of the point light source 30. The density of the diffuse pattern elements in the diffuse pattern 24 shown in FIG. 9 almost satisfies the equation (2).

Figure 20A:
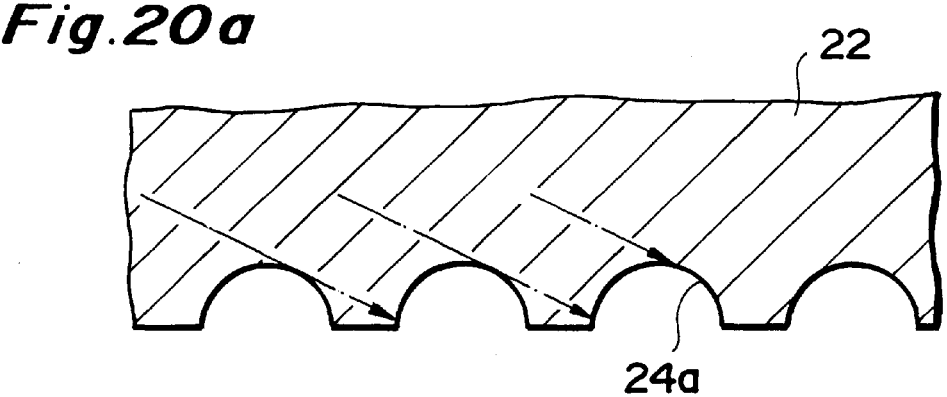
FIGS. 20a and 20b are diagrams showing the effect between diffuse pattern elements.
Figure 20B:
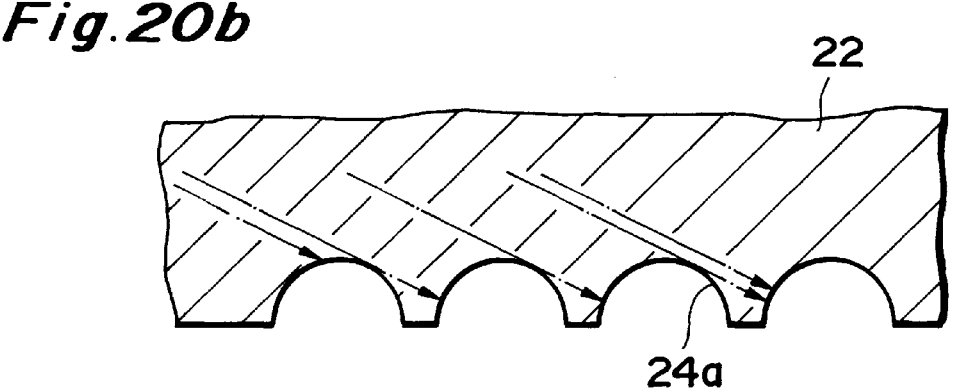

Description is now made of the results of the measurement shown in FIG. 19. FIG. 19 is a graph showing the dependence of the output rate ρ of light emitted from the optical guide plate on the density of the diffuse pattern. An example of the optical guide plate is one made of acrylics having a thickness of 0.8 mm (an index of refraction of 1.492) and having the diffuse pattern elements shown in FIG. 10 formed on its lower surface. Within a range in which the density of the diffuse pattern elements is small, there is no effect between the diffuse pattern elements 24a (see FIG. 20a), so that the output rate ρ linearly increases with the density of the diffuse pattern elements. When the density of the diffuse pattern elements increases, light incident on a certain diffuse pattern element 24a is affected by a diffuse pattern element adjacent thereto (see FIG. 20b), so that the output rate ρ is saturated. The output rate exhibits its maximum value when the density of the diffuse pattern elements is 80% in the measurement.

Figure 21:
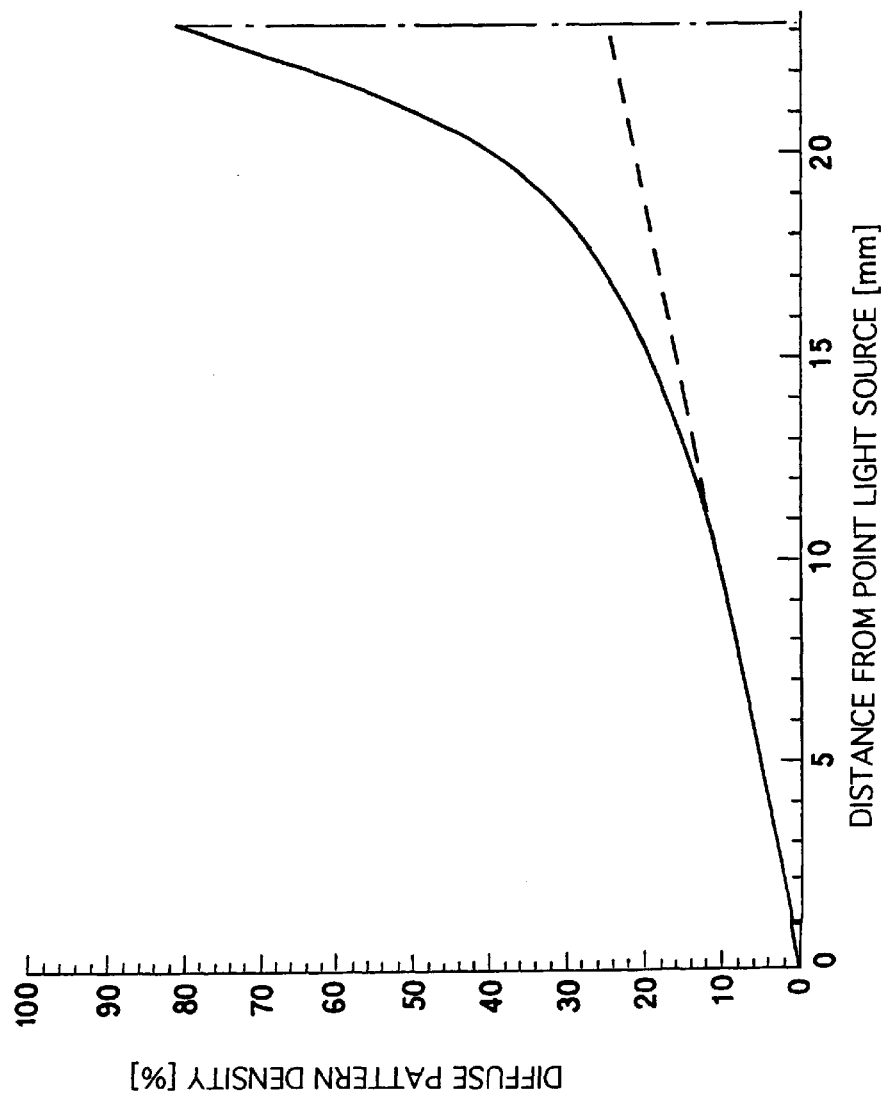
FIG. 21 is a graph showing the relationship between the distance from a point light source and the density of diffuse pattern elements in a surface light source device having uniform luminance.
Figure 22:
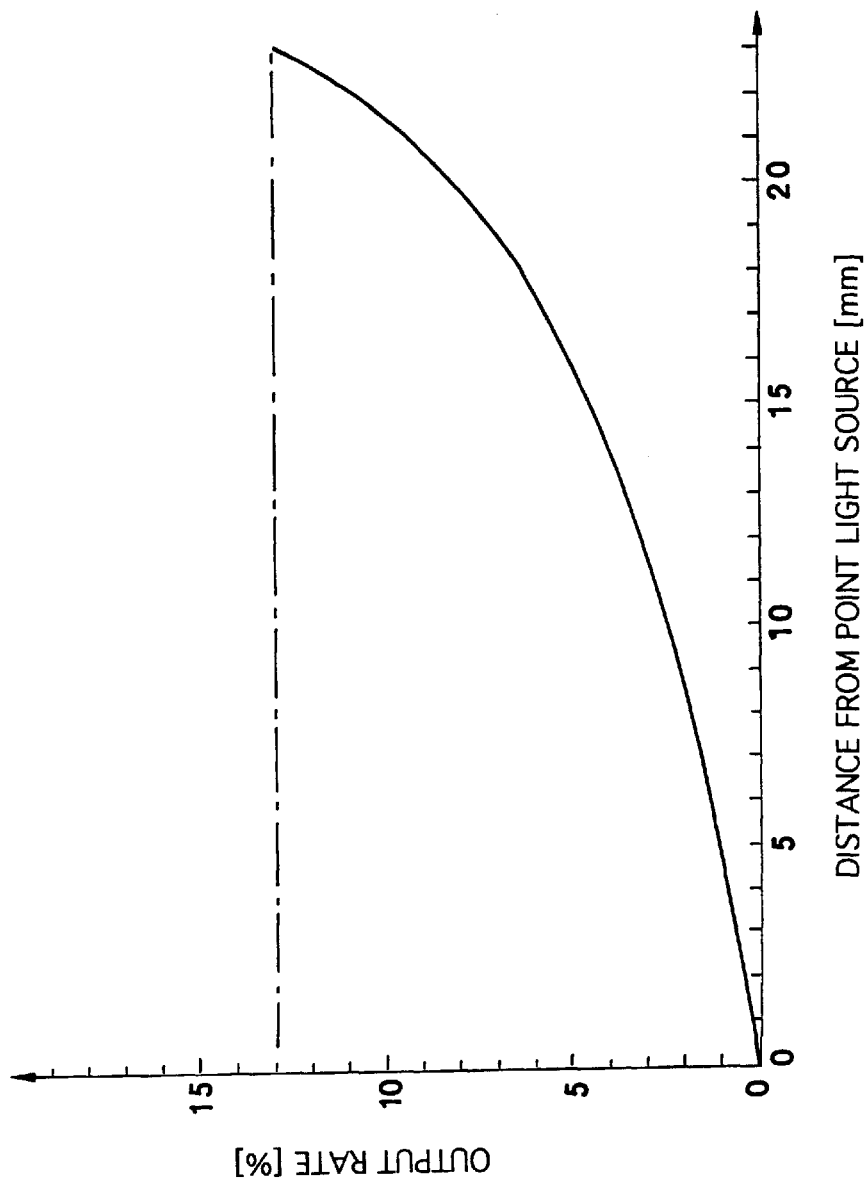
FIG. 22 is a graph showing the relationship between the distance from a point light source and the output rate in a surface light source device having uniform luminance.

FIG. 21 shows data representing the relationship between the density of the diffuse pattern elements and the distance r from the point light source 30 in the surface light source device 21 having a uniform luminance distribution (conforming to the above-mentioned theory), and FIG. 22 shows data representing the relationship between the output rate ρ and the distance r from the point light source 30 in the same case as above. The graph shown in FIG. 21 exhibits a tendency conforming to the above-mentioned equation (2). In FIG. 22, when the distance r from the point light source 30 increases, the density of the diffuse pattern elements increases, so that the output rate ρ increases. As seen from FIG. 19, the maximum value of the output rate ρ is approximately 13%. Therefore, FIG. 22 shows that the output rate p is saturated at a position spaced approximately 23 mm apart from the point light source 30.

Second Embodiment

Figure 23:
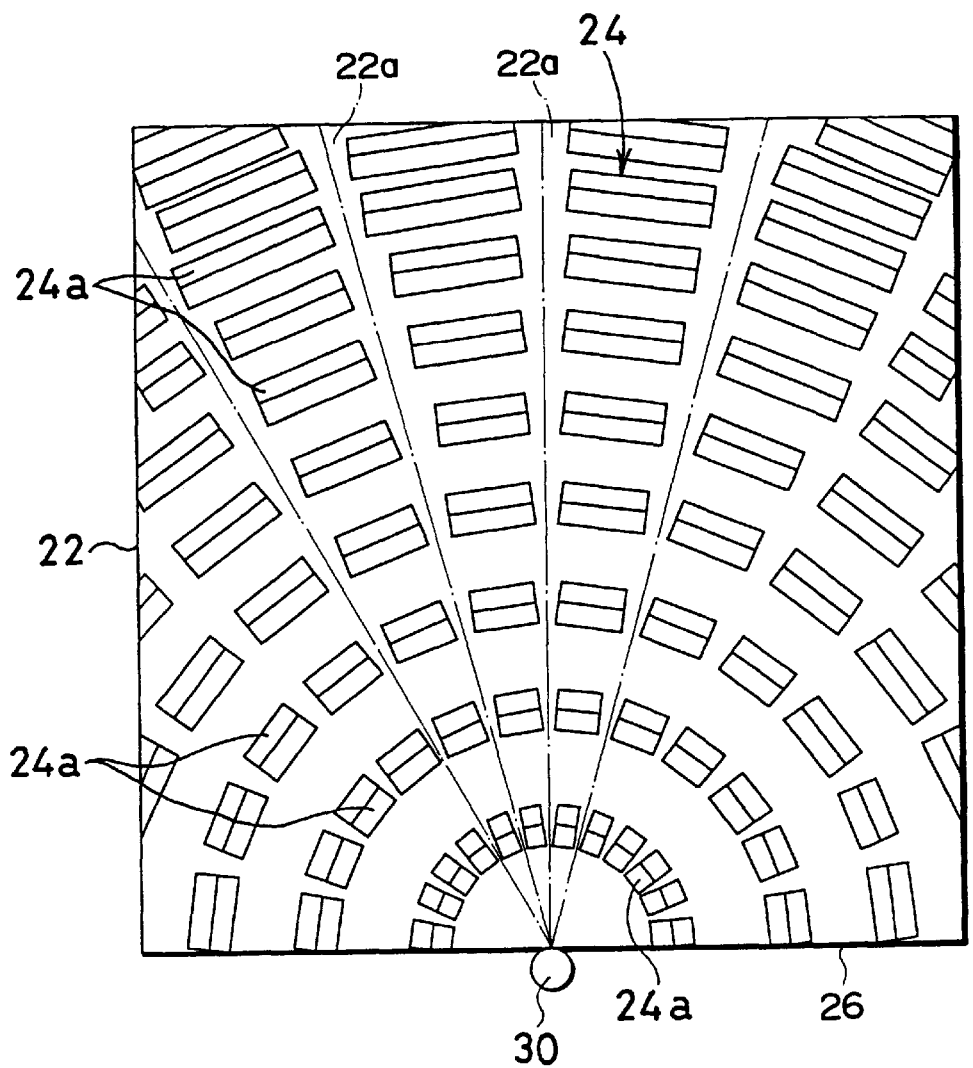
FIG. 23 is a bottom view showing a diffuse pattern on an optical guide plate in a surface light source device according to a second embodiment of the present invention.

FIG. 23 illustrates a diffuse pattern on an optical guide plate in a surface light source device according to a second embodiment of the present invention. In the present embodiment, the lower surface of an optical guide plate 22 is divided into a plurality of areas 22a by dividing lines indicated by a one-dot and dash line which extends radially from a point light source 30 (only some examples are illustrated). If the lower surface of the optical guide plate 22 is thus divided into the plurality of areas 22a, the arrangement and the density of diffuse pattern elements 24a can be designed in consideration of the quantity of light incident from the point light source 30 (which generally differs slightly from area to area) (see a third embodiment shown in the following).

Generally speaking, all the diffuse pattern elements 24a are arranged at an angle of approximately 90° to the direction toward the point light source 30, and the length L of each of the diffuse pattern elements 24a gradually increases as a distance r from the point light source 30 increases. Further, the density of the diffuse pattern elements 24a changes in accordance with the equation (2).

Third Embodiment

Figure 24:
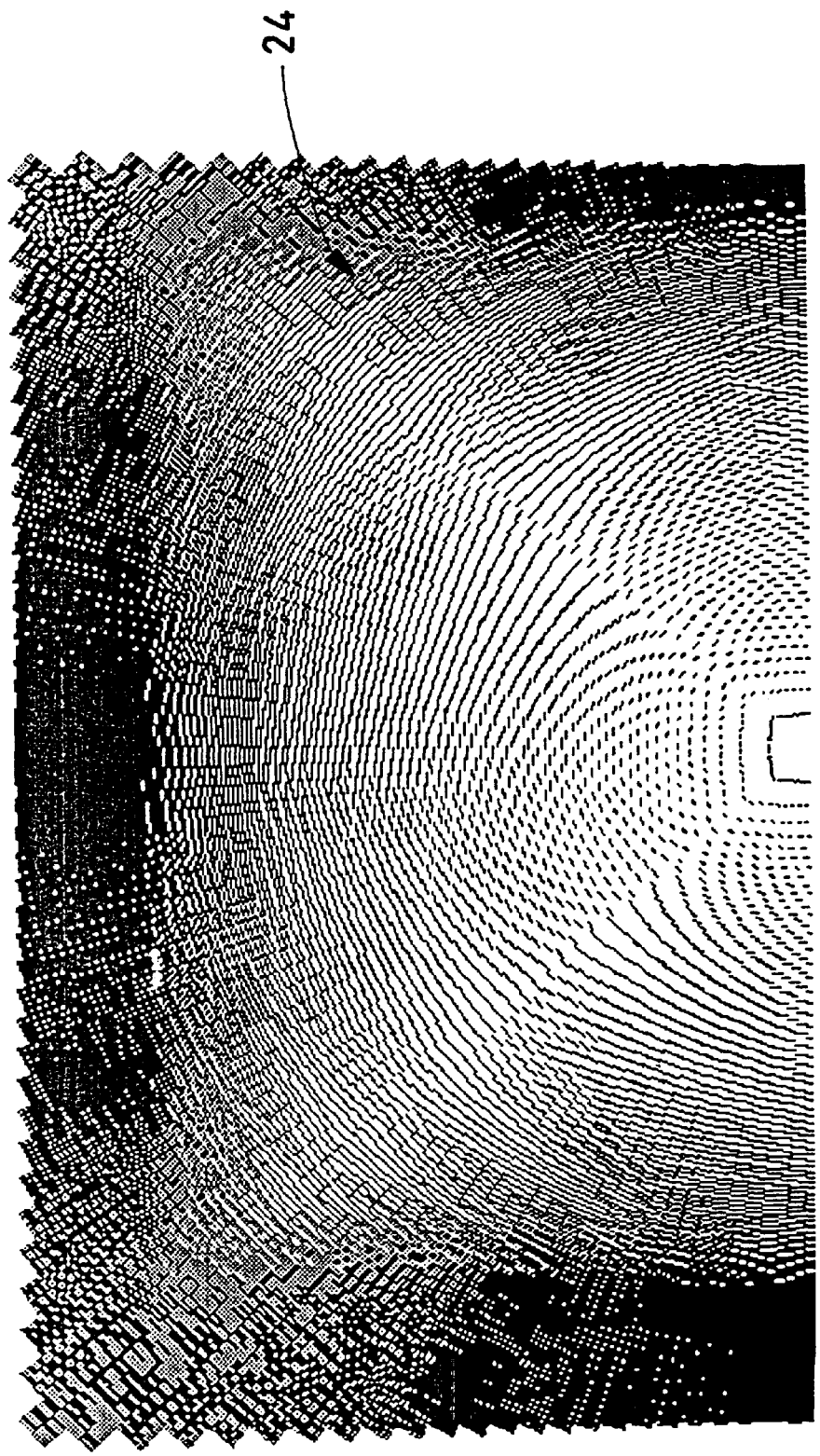
FIG. 24 is a bottom view showing a diffuse pattern on an optical guide plate in a surface light source device according to a third embodiment of the present invention.
Figure 25:
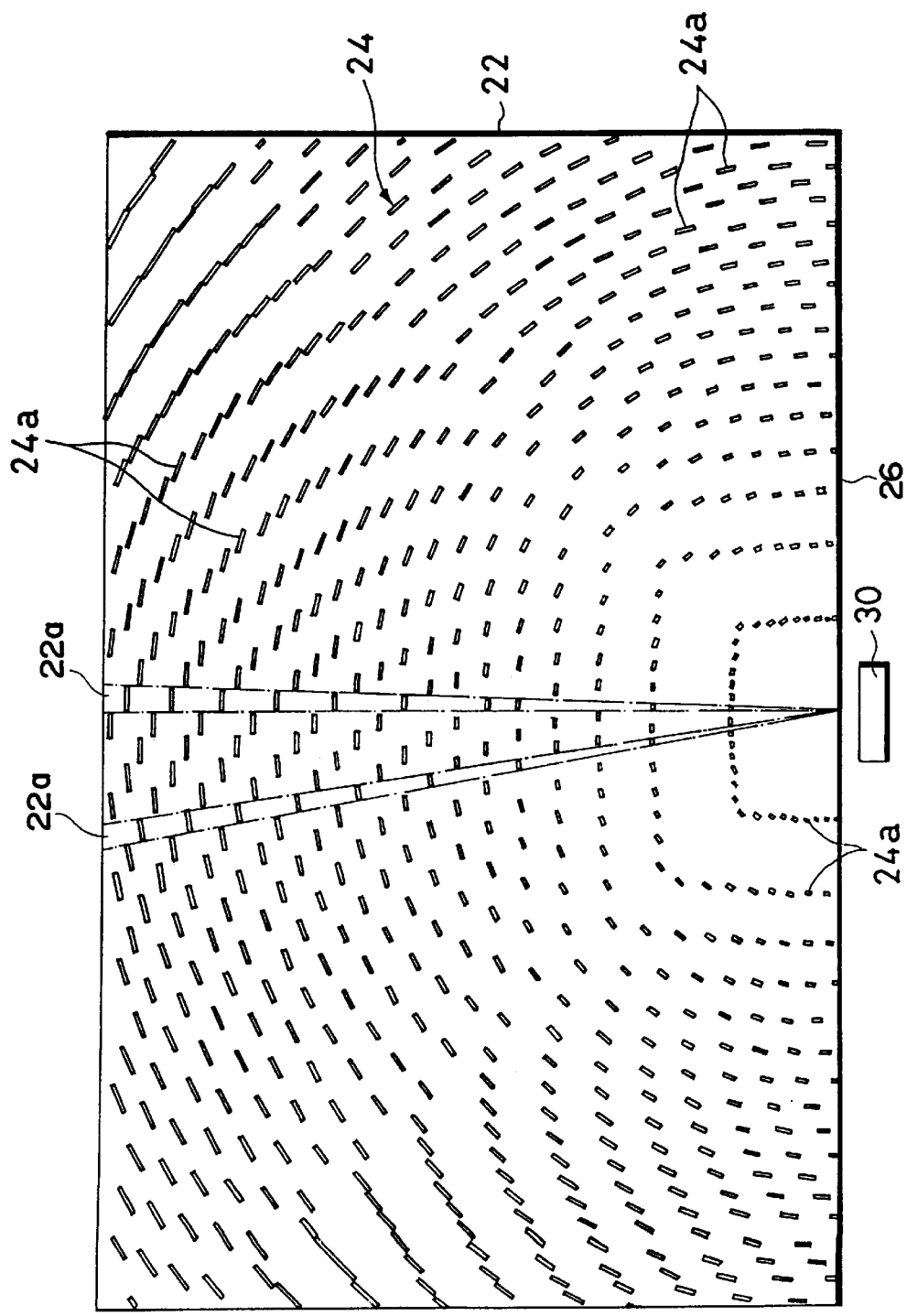
FIG. 25 schematically illustrates the diffuse pattern shown in FIG. 24 easily to understand.

An example in which the lower surface of an optical guide plate 22 is divided into a plurality of areas by lines radially extending from a point light source, and a diffuse pattern in each of the areas is formed in consideration of the light quantity distribution depending on the direction of light emitted from the point light source is illustrated in FIG. 24. FIG. 25 is a schematic view for making the diffuse pattern shown in FIG. 24 easy to understand. The arrangement and the density of diffuse pattern elements 24a in each of areas 22a obtained by the division are designed in correspondence with the angular distribution of the light quantity of light emitted from a point light source 30, so that the distribution of the quantity of output light can be made uniform throughout a light output surface 23 of the optical guide plate 22.

Generally speaking, in all the areas 22a, the direction in which the diffuse pattern elements 24a are arranged forms an approximately constant angle (approximately 90°) with a direction along the line connecting the point light source 30 and the diffuse pattern elements 24a, and the density of the diffuse pattern elements 24a changes in accordance with the equation (2). Further, the density of the diffuse pattern elements 24a is zero in the vicinity of the point light source 30.

Fourth Embodiment

Figure 26:
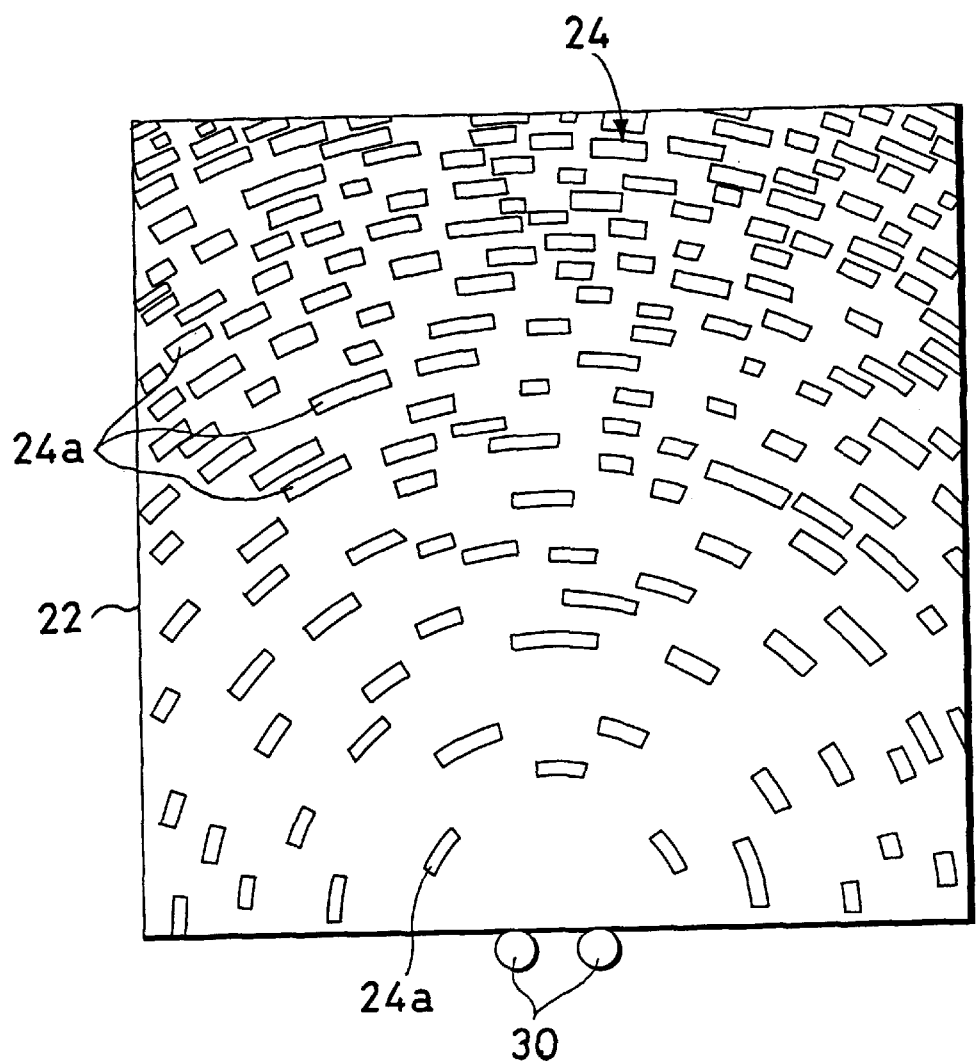
FIG. 26 is a bottom view showing a diffuse pattern on an optical guide plate in a surface light source device according to a fourth embodiment of the present invention.

FIG. 26 illustrates an optical guide plate in a surface light source device according to a fourth embodiment of the present invention. The surface light source device comprises a plurality of point light sources 30, and the point light sources 30 are disposed, relatively close to one another. When the plurality of point light sources 30 are thus disposed, close to one another, the plurality of point light sources 30 can be regarded as one point light source. Therefore, a diffuse pattern 24 may be designed, considering that one point light source exists at the central position of the point light sources 30.

Fifth Embodiment

Figure 27:
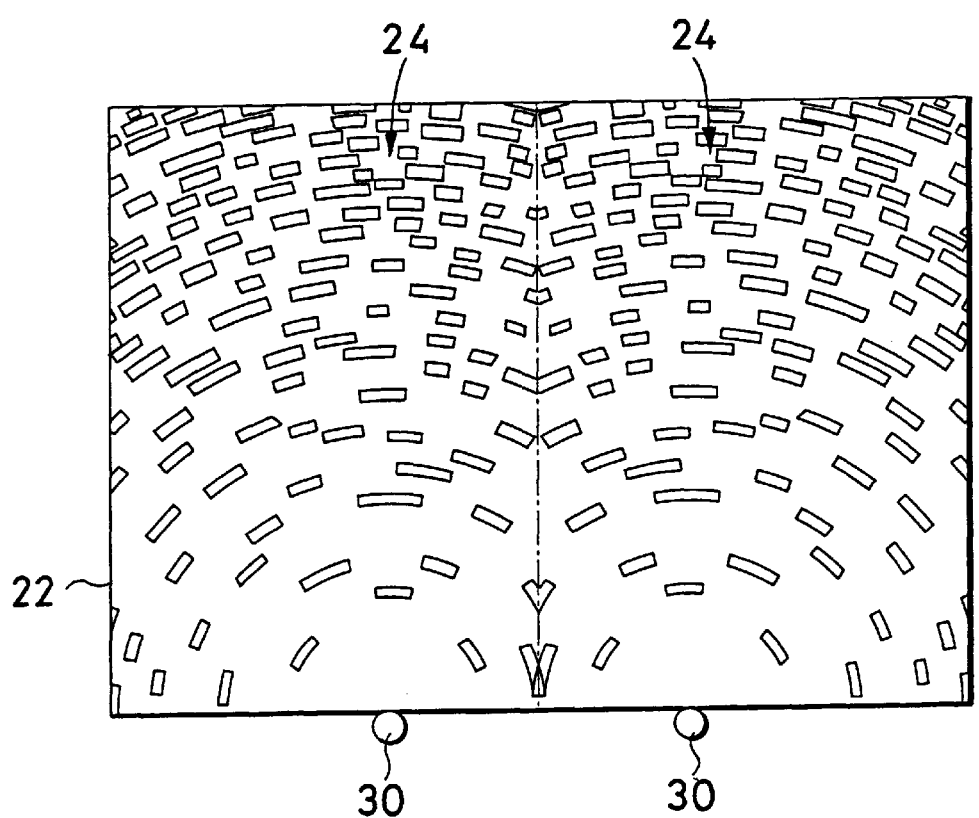
FIG. 27 is a bottom view showing a diffuse pattern on an optical guide plate in a surface light source device according to a fifth embodiment of the present invention.

FIG. 27 illustrates a surface light source device according to a fifth embodiment of the present invention. The surface light source device comprises a plurality of point light sources 30, and the point light sources 30 are spaced apart from each other. When the plurality of point light sources 30 are arranged so as to be spaced apart from each other, an optical guide plate 22 may be divided for each of the point light sources 30, to respectively design diffuse patterns 24 such that for each of areas obtained by the division, the luminance distribution is uniform with respect to the corresponding point light source 30, and the luminance of the surface light source device is increased, that is, the equation (2) is satisfied. Particularly, it is desirable that the density of the diffuse pattern 24 is zero in the vicinity of each of the point light sources 30.

The plurality of point light sources 30 need not be disposed on an end surface on the same side of the optical guide plate. They may be disposed on end surfaces on the opposite sides.

Sixth Embodiment

Figure 28A:
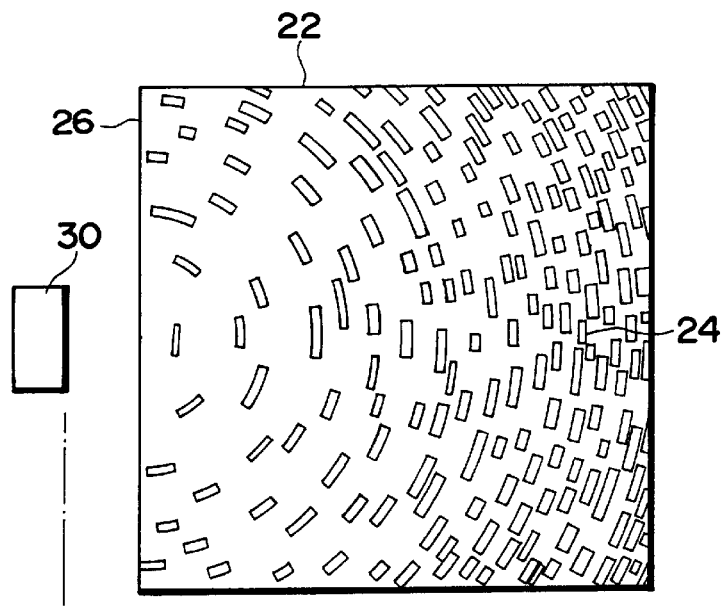
FIG. 28a is a bottom view showing a diffuse pattern on a surface light source device according to a sixth embodiment of the present invention.
Figure 28B:
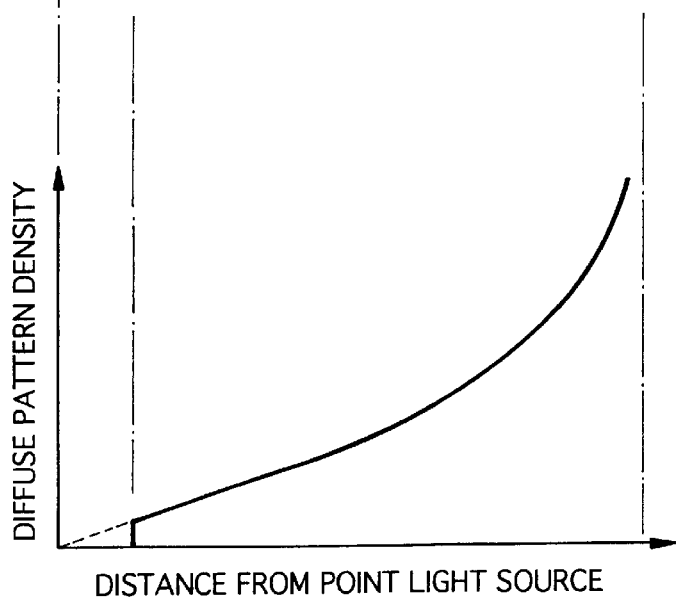
FIG. 28b is a graph showing the relationship between the distance from a point light source and the density of diffuse pattern elements.

FIG. 28a illustrates a surface light source device according to a sixth embodiment of the present invention. In the surface light source device, a point light source 30 is disposed slightly spaced apart from a light incidence surface 26 of an optical guide plate 22. In such a case, the point light source 30 may be disposed at the position where the density of diffuse pattern elements is zero on the extension of a linear line portion of the density of the diffuse pattern elements as shown in FIG. 28b.

In the case of a linear light source, the density of the diffuse pattern elements is not zero even in the vicinity of the light source, as described above. On the other hand, in the case of a point light source 30, the density of the diffuse pattern elements is approximately zero in the vicinity of the point light source. Even if a diffuse pattern (that is, an optical guide plate) is not provided in the vicinity of the point light source as in the present embodiment, the luminance distribution is slightly affected or hardly affected.

Seventh Embodiment

Consider the relationship between the light quantity Q of output light and the thickness of an optical guide plate 22. The thickness of the optical guide plate 22 shall change depending on a distance r from a point light source 30, which is represented by t (r). As illustrated in FIGS. 29a and 29b, when the thickness of the optical guide plate 22 is reduced to half from t to t/2, the number of times light f per unit length of the optical guide plate 22 impinges a diffuse pattern 24 and a light output surface 23 doubles, so that the light quantity Q of output light doubles. As shown in FIG. 30, therefore, the light quantity Q of output light is inversely proportional to the thickness t (r) of the optical guide plate 22.

Description has been made of such an embodiment that the density of the diffuse pattern elements (the output rate) linearly increases with the distance from the point light source in a place relatively near the light source, while increasing in excess of a linear relationship with the distance from the light source (that is, rapidly or such that a differential of first-order increases) in a place far from the light source on the assumption that the thickness of the optical guide plate is constant irrespective of the position or the place thereon.

A case where the thickness of the optical guide plate changes depending on the position or the place thereon is assumed. If the thickness of the optical guide plate is one-half in a case where an attempt to obtain the same quantity of output light is made, the density of the diffuse pattern elements may be one-half as described above. This relationship can be generalized as follows. That is, in order to obtain the quantity of output light which is uniform irrespective of the place on the optical guide plate, the surface light source device is constructed such that [(the density of the diffuse pattern elements)/(the thickness of the optical guide plate)] linearly increases with the distance from the light source in a place relatively near the light source, while increasing in excess of a linear relationship with the distance from the light source in a place far from the light source.

In other words, in the place relatively near the light source, the surface light source device must be constructed such that {(the density of the diffuse pattern elements)/[(the thickness of the optical guide plate)×(the distance from the light source)]} is approximately constant in the place relatively near the light source, while increasing as the distance from the light source increases.

An optical guide plate in which a uniform quantity of output light is obtained can be thus designed in consideration of the change in the thickness of the optical guide plate depending on the place thereon. As described below, the thickness of the optical guide plate can be also made use of more positively as a design factor for compensating for the saturation of the output rate in an area where the density of the diffuse pattern elements is high.

Figure 31:
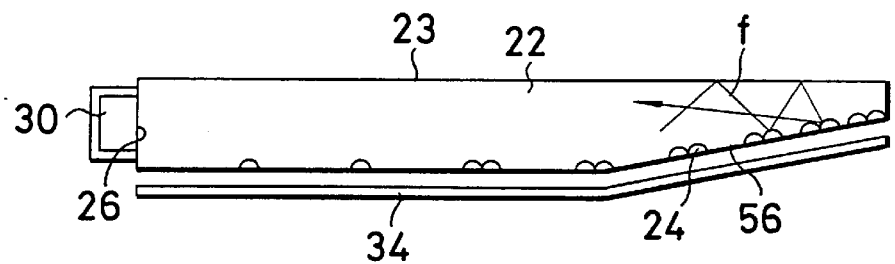
FIG. 31 is a cross-sectional view showing a surface light source device according to a seventh embodiment of the present invention.

In FIG. 31, a flat inclined surface 56 is formed in a place near an end, on the opposite side of a light incidence surface 26, of the lower surface of an optical guide plate 22, so that the optical guide plate 22 gradually thins.

In a place far from a point light source 30, the density of diffuse pattern elements provided in the optical guide plate 22 is saturated upon gradually increasing. Particularly, the output rate reaches its maximum when the density of the diffuse pattern elements is 80% (see FIG. 19). In an area farther away from the light source 30 than above place, the quantity of output light is insufficient, so that the optical guide plate 22 is darkened. When in the area spaced apart from the point light source 30, the thickness of the optical guide plate 22 is gradually decreased by forming the inclined surface 56 on the optical guide plate 22, the number of times light is reflected from the optical guide plate 22 increases (see FIGS. 29a and 29b), so that the amount of output light from the optical guide plate 22 increases, thereby making it possible to prevent the end of the optical guide plate 22 from being darkened.

The thickness of the optical guide plate 22 at an end of the inclined surface 56 is not more than approximately one-half the thickness of a portion having no inclined surface 56. The thickness of the optical guide plate 22 is approximately 0.8 mm. When the inclined surface 56 is formed throughout the optical guide plate 22, the strength of the optical guide plate 22 decreases, so that the optical guide plate 22 tends to be warped or cracked, thereby making it difficult to fabricate and handle the optical guide plate 22. The strength of the optical guide plate 22 can be prevented from decreasing by forming the inclined surface 56 on only a necessary part of the optical guide plate 22.

As apparent from FIG. 21, the density of the diffuse pattern elements is saturated upon rapidly increasing beyond the center of the optical guide plate 22. Consequently, an area where the inclined surface 56 is provided is sufficient if it is not more than approximately one-half the length of the optical guide plate 22.

Eighth Embodiment

Figure 32:
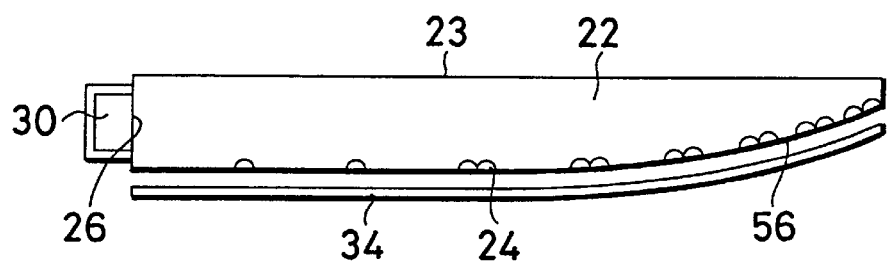
FIG. 32 is a cross-sectional view showing a surface light source device according to an eighth embodiment of the present invention.

FIG. 32 is a cross-sectional view showing a surface light source device according to an eighth embodiment of the present invention. In the surface light source device, an inclined surface 56 which is curved is formed on the lower surface of an optical guide plate 22 on an area near an end, on the opposite side of a light incidence surface 26, of the optical guide plate 22.

In the surface light source device using a point light source 30, the change in the density of diffuse pattern elements with the change in the distance from the optical light source 30 is as shown in FIG. 21. In consideration of the curve of the change of the density of the diffuse pattern elements in an area spaced apart from the point light source 30, it is found that a curved inclined surface is more suitable than a flat inclined surface.

Ninth Embodiment

Figure 33:
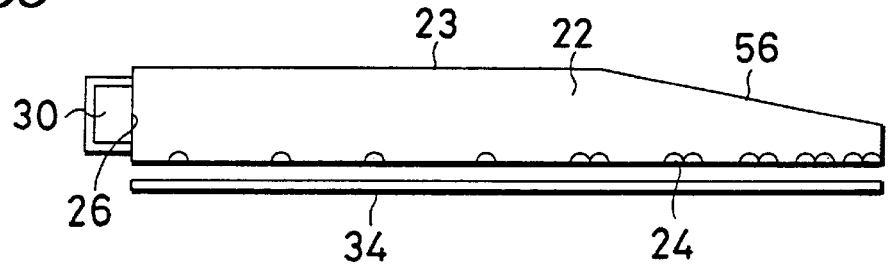
FIG. 33 is a cross-sectional view showing a surface light source device according to a ninth embodiment of the present invention.

FIG. 33 is a cross-sectional view showing a surface light source device according to a ninth embodiment of the present invention. In the surface light source device, an inclined surface 56 is formed on a light output surface 23 of an optical guide plate 22. A diffuse pattern 24 is formed on the lower surface of the optical guide plate 22. When the inclined surface 56 is provided on the lower surface of the optical guide plate 22, therefore, the structure of the optical guide plate 22 becomes complicated, and the formation thereof becomes difficult. The formation of the optical guide plate 22 is simplified by providing the inclined surface 56 on the light output surface 23 of the optical guide plate 22, so that the structure of a metal mold can be simplified.

Tenth Embodiment

Figure 34:
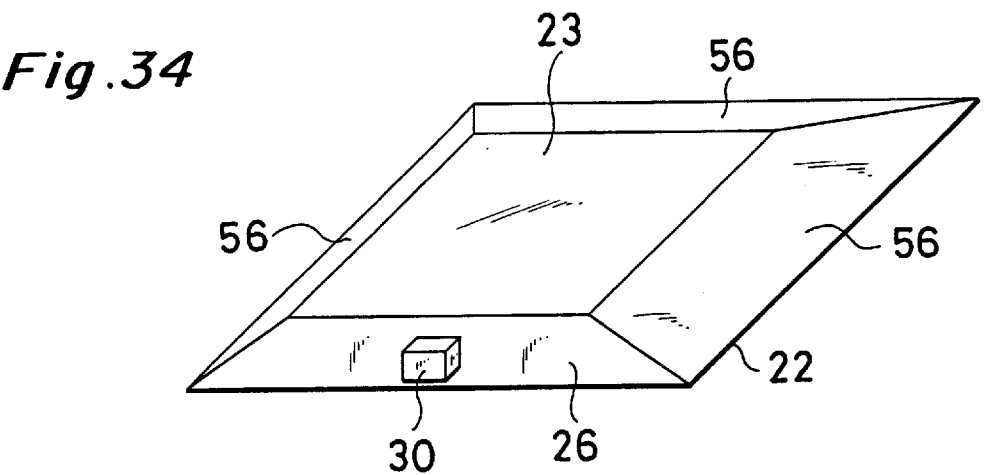
FIG. 34 is a perspective view of an optical guide plate in a surface light source device according to a tenth embodiment of the present invention.

FIG. 34 is a perspective view showing a optical guide plate in a surface light source device according to a tenth embodiment of the present invention. In the surface light source device, inclined surfaces 56 are formed on outer peripheral portions other than a light incidence surface 26 of an optical guide plate 22. In the case of a point light source 30, not only an end, on the opposite side of the point light source 30, of the optical guide plate 22 but also both right and left sides thereof are darkened. In the surface light source device using the point light source 30, the provision of inclined surfaces 56 in the vicinities of three sides of the optical guide plate 22 is effective.

Eleventh Embodiment

Figure 35:
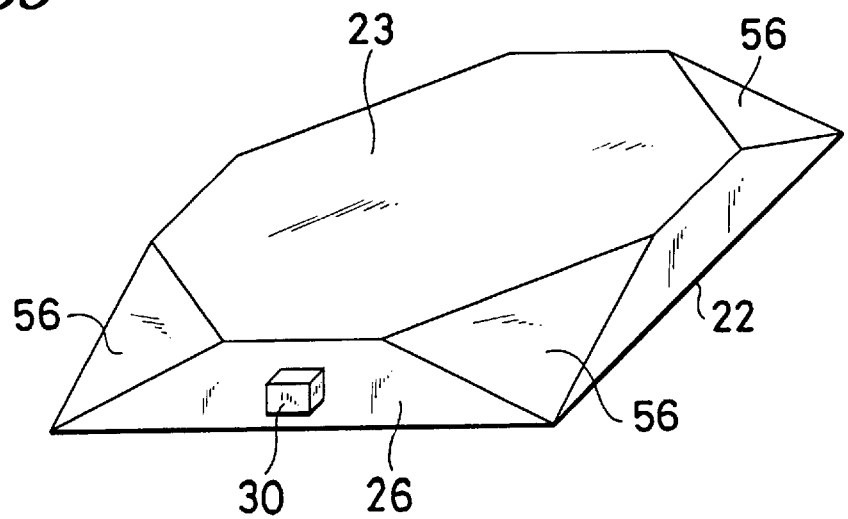
FIG. 35 is a perspective view of an optical guide plate in a surface light source device according to an eleventh embodiment of the present invention.

FIG. 35 is a perspective view showing an optical guide plate in a surface light source device according to an eleventh embodiment of the present invention. In the surface light source device, inclined surfaces 56 are formed at four corners of an optical guide plate 22. In a case where a point light source 30 is used, the corners of the optical guide plate 22 are liable to be darkened. Therefore, four corners of a light output surface 23 can be prevented from being darkened by providing the inclined surfaces 56 at the four corners of the optical guide plate 22. In this case, it goes without saying that inclined surfaces may be formed on three sides, excluding the side on which a light incidence surface is positioned, of the optical guide plate 22.

Twelfth Embodiment

Figure 36:
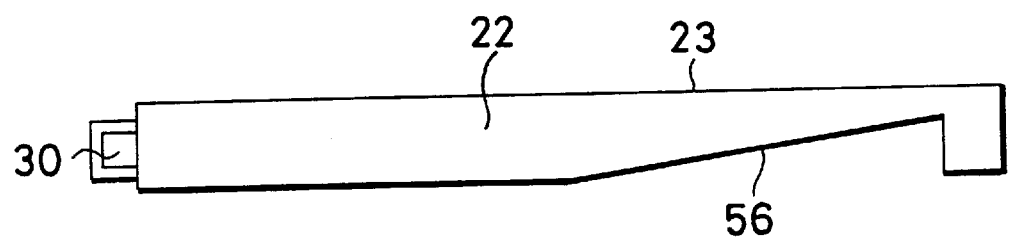
FIG. 36 is a cross-sectional view of an optical guide plate in a surface light source device according to a twelfth embodiment of the present invention.

FIG. 36 is a cross-sectional view showing an optical guide plate in a surface light source device according to a twelfth embodiment of the present invention. In the surface light source device, an inclined surface 56 is formed on the lower surface of an optical guide plate 22 in such a manner that the inclined surface 56 does not reach an end of the optical guide plate 22. Since the inclined surface does not reach the end of the optical guide plate 22, the stability of the optical guide plate 22 is improved when the optical guide plate 22 is set.

Thirteenth Embodiment

Figure 37:
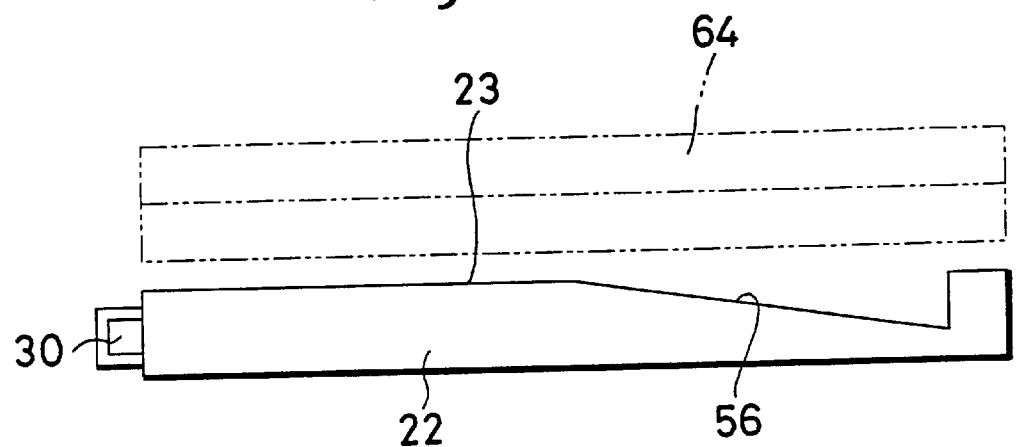
FIG. 37 is a cross-sectional view of an optical guide plate in a surface light source device according to a thirteenth embodiment of the present invention.

FIG. 37 is a cross-sectional view showing an optical guide plate in a surface light source device according to a thirteenth embodiment of the present invention. In the surface light source device, an inclined surface 56 is formed in a light output surface 23 of an optical guide plate 22 in such a manner that the inclined surface 56 does not reach an end of the optical guide plate 22. When a liquid crystal display panel 64 or the like is placed on the optical guide plate 22, the whole periphery of the liquid crystal display panel 64 or the like can be supported, so that the liquid crystal display panel 64 or the like is stabilized.

Fourteenth Embodiment

Figure 38:
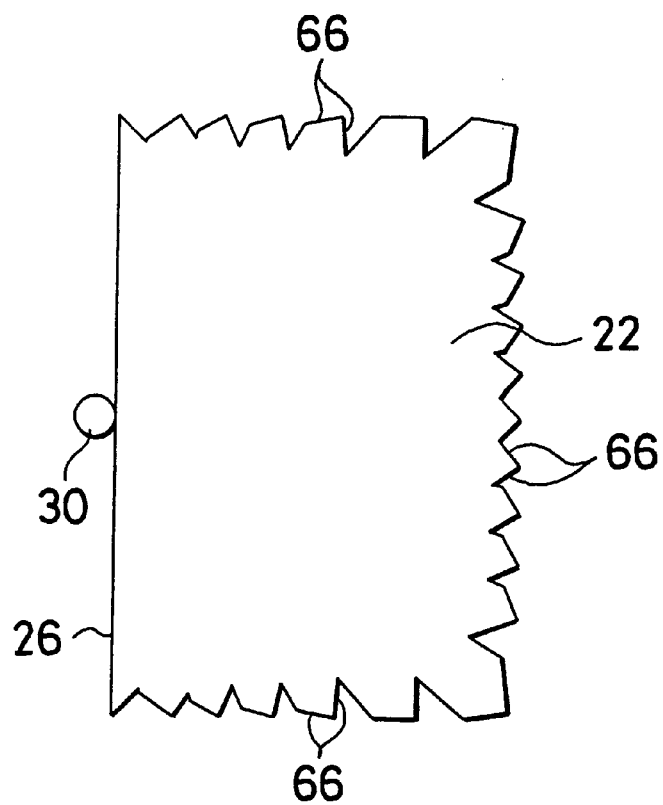
FIG. 38 is a plan view of an optical guide plate in a surface light source device according to a fourteenth embodiment of the present invention.
Figure 39:
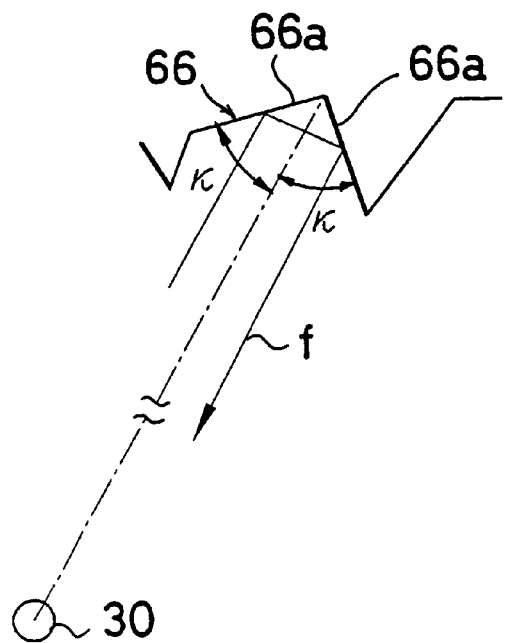
FIG. 39 is an enlarged view of a return reflecting portion.

FIG. 38 is a plan view showing a surface light source device according to a fourteenth embodiment of the present invention. In the surface light source device, a plurality of return reflecting portions 66 are formed on three sides of an optical guide plate 22. Each of the return reflecting portions 66 is constituted by two sides 66*a*, as shown in FIG. 39. The two sides 66*a* respectively have an inclination K of 45° to a direction toward a point light source 30, and form an angle of approximately 90° with each other.

Light f output from the point light source 30 and propagating inside the optical guide plate 22 to reach the outer periphery thereof is returned in the original direction upon being totally reflected twice from the return reflecting portion 66. Consequently, there is less possibility that light leaks from an outer peripheral surface of the optical guide plate 22, resulting in lesser loss, so that the luminance on the optical guide plate 22 can be increased.

When the point light source 30 is used, light from the point light source 30 is always incident on each of the return reflecting portions 66 in a predetermined direction. Therefore, the return reflecting portion 66 can be determined in consideration of the positional relationship with the point light source 30, so that the light from the point light source 30 can be prevented from leaking outward upon being totally reflected efficiently.

Fifteenth Embodiment

Figure 40:
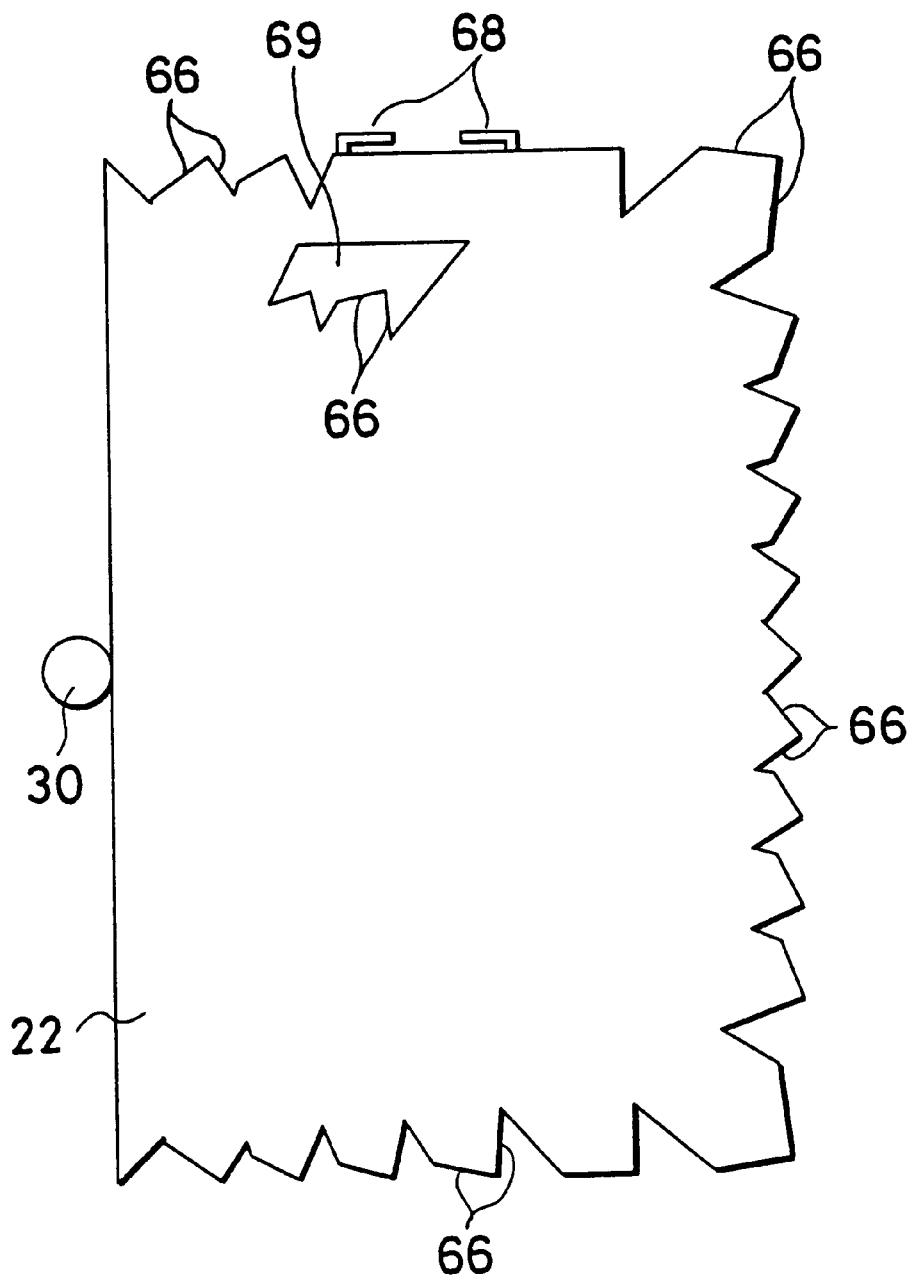
FIG. 40 is a plan view of an optical guide plate in a surface light source device according to a fifteenth embodiment of the present invention.

FIG. 40 is a plan view showing a surface light source device according to a fifteenth embodiment of the present invention. A holder 68 or the like for mounting a circuit board, for example, may, in some cases, be provided on an outer peripheral surface of an optical guide plate 22. Therefore, a return reflecting portion 66 cannot be provided on the outer peripheral surface of the optical guide plate 22. In such a case, the luminance of surface light source device can be increased by providing an outer peripheral portion of the optical guide plate 22 with a through hole 69 and forming a prism portion 66 on an inner surface of the through hole 69 to prevent light from leaking from the outer peripheral portion of the optical guide plate 22. It goes without saying that the position of the through hole 69 is the place where the optical guide plate 22 is not used as lighting.

Lighting Device

Figure 41:
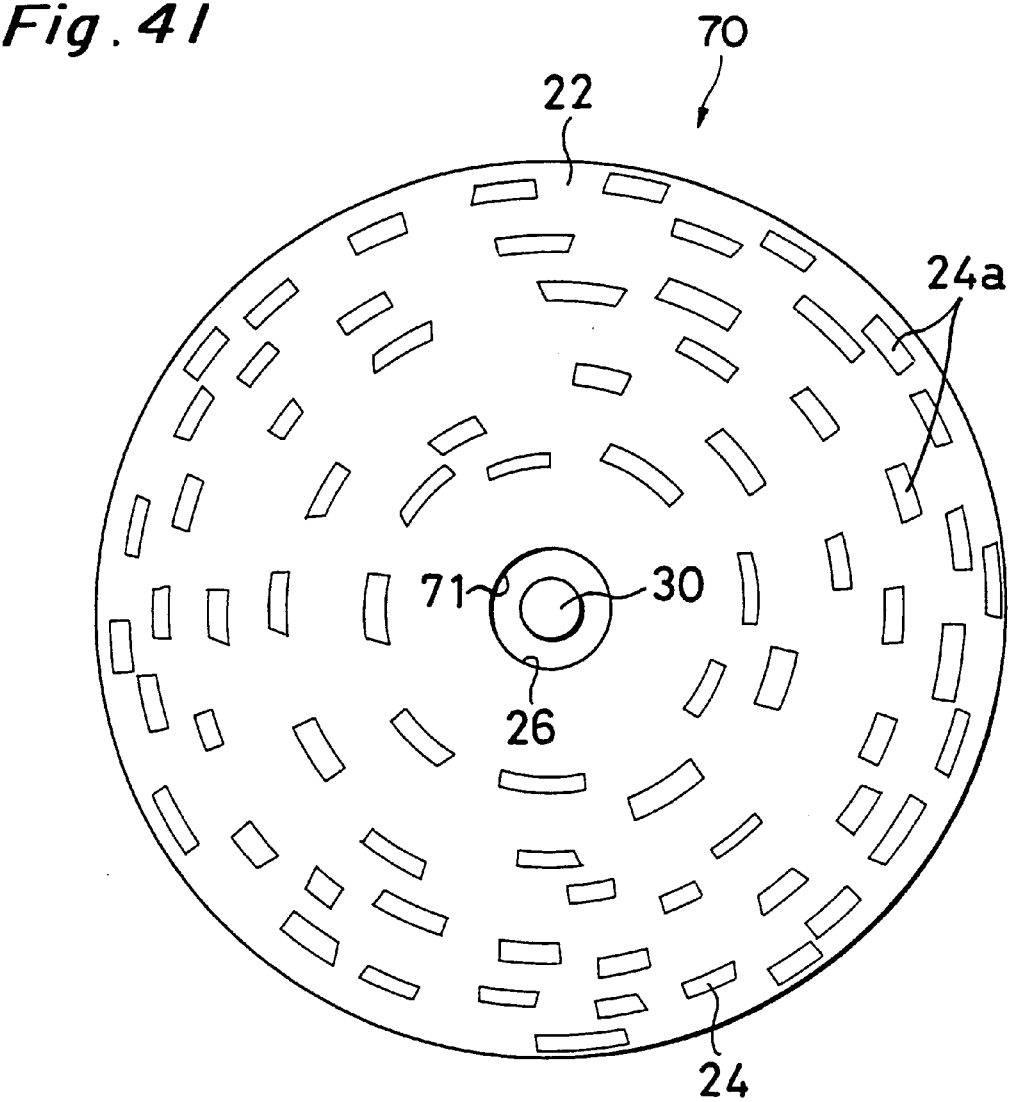
FIG. 41 is a plan view of a lighting device utilizing the surface light source device according to the present invention.

FIG. 41 is a plan view showing a lighting device 70 using the surface light source device according to the present invention.

In the lighting device 70, a point light source inserting portion (hole) 71 is formed at the center of an optical guide plate 22 in the shape of a disk, and a point light source 30 is contained in the point light source inserting portion 71. A diffuse pattern 24 composed of a lot of diffuse pattern elements 24*a* is formed on the lower surface of the optical guide plate 22, each of the diffuse pattern elements 24*a* is arranged at an angle of approximately 90° to the radial direction of the optical guide plate 22, and the density of the diffuse pattern elements 24*a* increases as the distance from an outer peripheral surface of the optical guide plate 24 decreases in accordance with the equation (2). Light emitted from the point light source 30 is introduced into the optical guide plate 22 from a light incidence surface 26 which is an inner peripheral surface of the point light source inserting portion 71, and is output from a light output surface which is a front surface of the optical guide plate. The lighting device 70 emits light with uniform luminance.

Liquid Crystal Display Device

Figure 42:
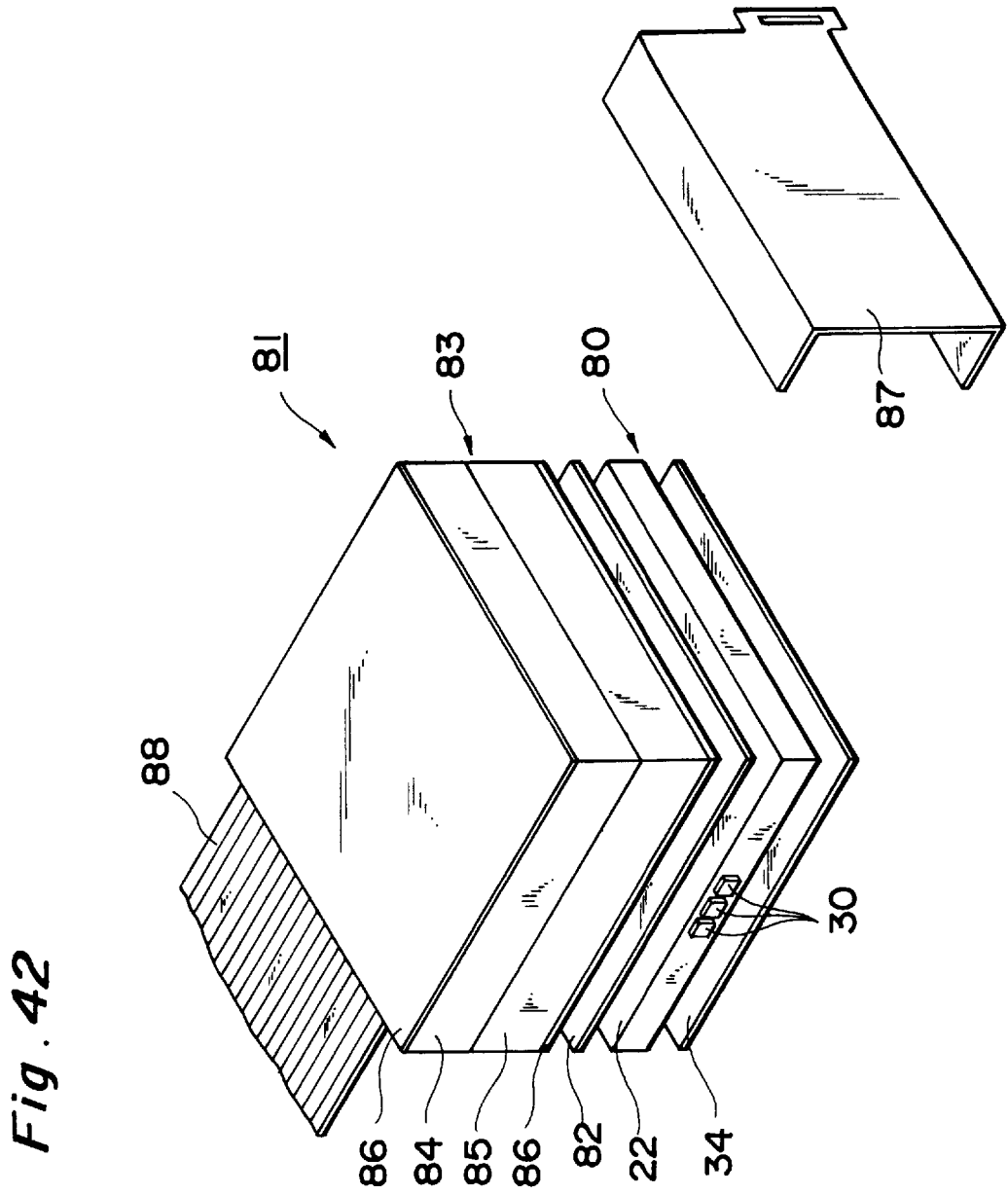
FIG. 42 is an exploded perspective view of a liquid crystal display device utilizing the surface light source device according to the present invention.

FIG. 42 is an exploded perspective view showing a liquid crystal display device 81 using a surface light source device 80 according to the present invention. In the surface light source device 80, point light sources 30 in three colors, that is, red (R), green (G), and blue(B) are provided, close to one another, on a light incidence surface of an optical guide plate 22. A diffuse reflecting sheet 82 is disposed on a front surface of the surface light source device 80, and a liquid crystal display panel 83 is disposed on a front surface of the diffuse reflecting sheet 82. The liquid crystal display panel 83 is one obtained by sealing a liquid crystal material between two liquid crystal substrates (glass substrates or film substrates) 84 and 85 having transparent electrodes, TFTS, color filters, black matrices, or the like formed thereon, and disposing polarizing plates 86 on both outer surfaces of the liquid crystal substrates 84 and 85. The surface light source device 80 and the liquid crystal display panel 83 are overlapped, and are integrated by a case 87. The liquid crystal display panel 83 is connected to a liquid crystal driving circuit by a flat cable 88.

In this liquid crystal display device 81, the luminance distribution on a display screen can be made uniform, and the luminance thereof can be increased. Therefore, the quality of an image on the liquid crystal display device 81 can be improved.

Figure 43:
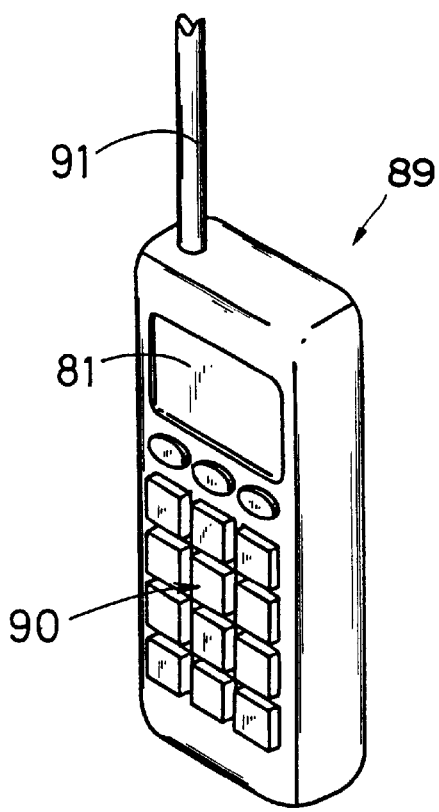
FIG. 43 is a perspective view showing a portable telephone comprising for a display a liquid crystal display device.
Figure 44:
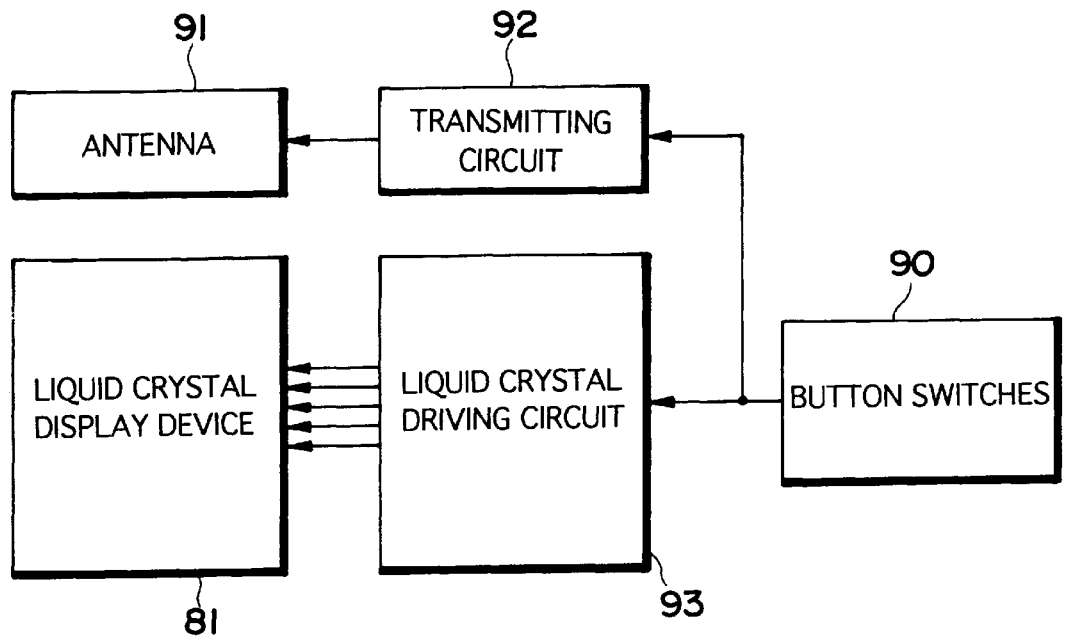
FIG. 44 is a block diagram showing the electrical configuration for driving a liquid crystal display device in the portable telephone.

The liquid crystal display device is preferably used for a wireless information transmission device such as a portable telephone or a weak power radio-frequency transceiver, a small-sized information terminal such as a portable personal computer, an electronic notebook or an electronic calculator, and so forth. FIG. 43 is a perspective view showing a portable telephone 89 comprising for a display the liquid crystal display device as shown in FIG. 42, and FIG. 44 is a block diagram showing the function thereof. A button switches 90 such as a ten-key pad for dial entry is provided on the front surface of the portable telephone 89, a liquid crystal display device 81 is disposed above the button switches 90, and an antenna 91 is provided on the upper surface of the portable telephone 89. When a dial or the like is entered from the button switches 90, information relating to the entered dial, for example, is transmitted to a base station of a telephone company from the antenna 91 via a transmitting circuit 92. On the other hand, the information relating to the entered dial, for example, is sent to a liquid crystal driving circuit 93, and the liquid crystal display device 81 is driven by the liquid crystal driving circuit 93, so that the dial information or the like is displayed on the liquid crystal display device 81.

Figure 45:
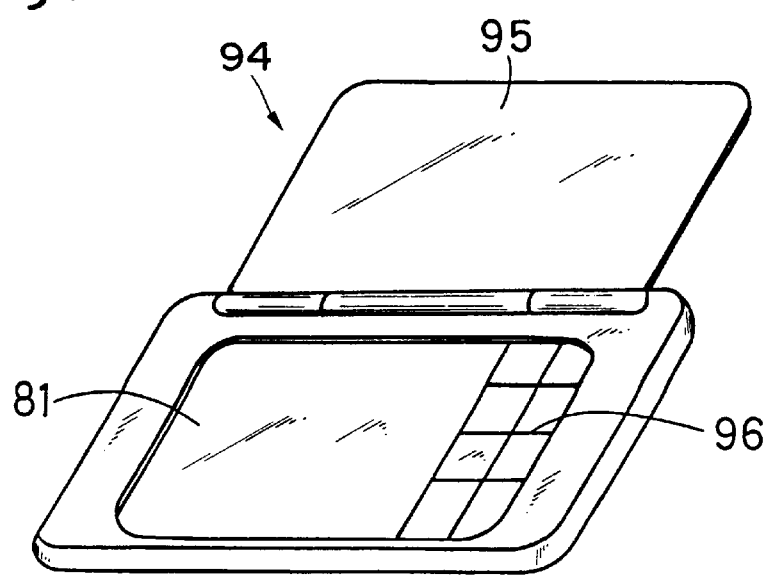
FIG. 45 is a perspective view showing an electronic notebook comprising for a display a liquid crystal display device.
Figure 46:
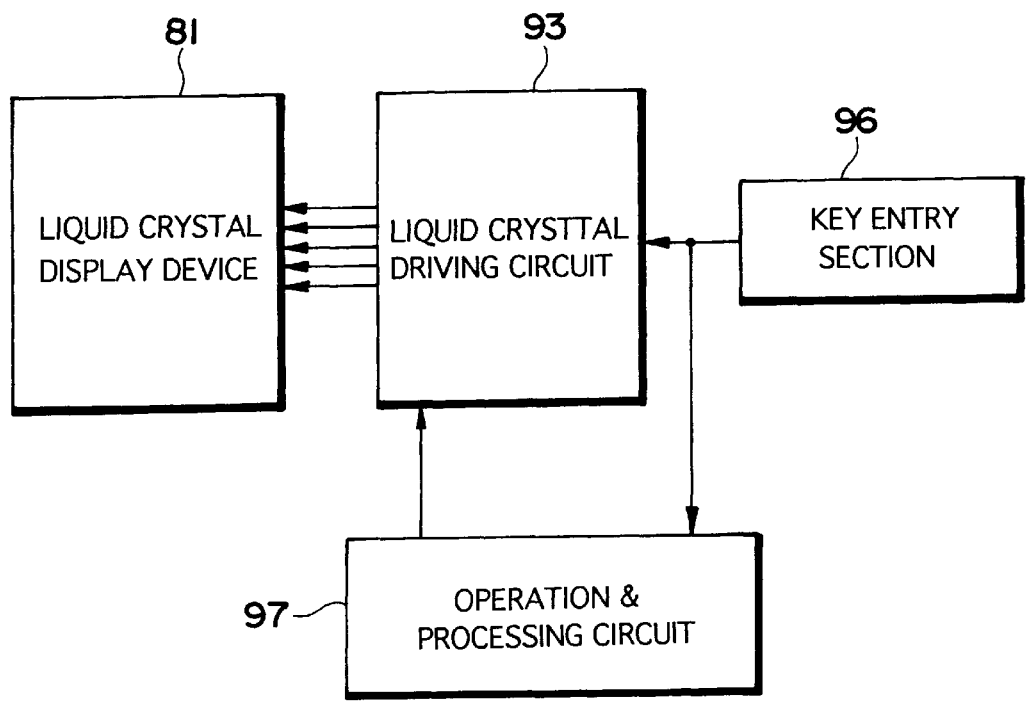
FIG. 46 is a block diagram shown the electrical configuration for driving a liquid crystal display device in the electronic notebook.

FIG. 45 is a perspective view showing an electronic notebook (a small-sized information terminal) 94 comprising for a display the liquid crystal display device 81 having the structure as shown in FIG. 42, and FIG. 46 is a block diagram showing the function thereof. The electronic notebook 94 comprises a key entry section (a touch switch) 96 and a liquid crystal display device 81 inside a cover 95. Inside the electronic notebook 94, a liquid crystal driving circuit 93, an operation and processing circuit 97 and so forth are provided. When information is entered by a ten-key or an alphabet key from the key entry section 96, the entered information is sent to the liquid crystal driving circuit 93, and is displayed on the liquid crystal display device 81. When a control key such as an operation key is then depressed, predetermined processing or operation is executed in the operation and processing circuit 97, and the result thereof is sent to the liquid crystal driving circuit 93, to be displayed on the liquid crystal display device 81.

What is claimed is:

1. A surface light source device comprising an optical waveguide plate for confining and propagating light introduced from a light incidence surface thereof and emitting the light outward from a light output surface thereof, and a point light source disposed on the side of the light incidence surface of the optical waveguide plate, wherein a diffuse pattern is formed almost all over a surface, on the opposite side of the light output surface, of the optical waveguide plate, the diffuse pattern comprises a plurality of diffuse pattern elements which are discreetly disposed, each of the diffuse pattern elements has directionality in its shape, the direction defined by the directionality of said diffuse pattern element is a direction along the length of the diffuse pattern element, and the direction along the length is approximately perpendicular to the direction along the line connecting the diffuse pattern element and the point light source.

2. The surface light source device according to claim 1, wherein the cross section of the diffuse pattern element in the direction along the line connecting the diffuse pattern element and the point light source is an isosceles triangle.

3. The surface light source device according to claim 1, wherein the cross section of the diffuse pattern element in the direction along the line connecting the diffuse pattern element and the point light source is a right angled triangle.

4. The surface light source device according to claim 1, wherein the cross section of the diffuse pattern element in the direction along the line connecting the diffuse pattern element and the point light source includes an arc-shaped edge.

5. The surface light source device according to claim 1, wherein the length of the diffuse pattern element decreases as the distance from the point light source decreases.

6. The surface light source device according to claim 1, wherein a surface of said optical waveguide plate is divided into a plurality of areas by lines extending radially from said point light source, and the density of the diffuse pattern is individually set for each area.

7. The surface light source device according to claim 1, wherein a plurality of point light sources are provided so as to face the light incidence surface of said optical waveguide plate, and a surface of said optical waveguide plate is divided into a plurality of areas in correspondence with the plurality of point light sources, the longitudinal direction of each of the plurality of diffuse pattern elements which are arranged in each of the areas is substantially perpendicular to the direction along the line connecting the corresponding point light source and the diffuse pattern element.

8. The surface light source device according to claim 1, wherein a plurality of point light sources are provided so as to face the light incidence surface of said optical waveguide plate and are disposed so as to be taken as one point light source, and the longitudunal direction of each of the plurality of diffuse pattern elements is substantially perpendicular to the direction along the line connecting the point light sources which are taken as one light source and the diffuse pattern element.

9. The surface light source device according to claim 1, wherein an inclined surface is formed an the optical waveguide plate within a range which is not more than approximately one-half the length of the optical waveguide plate toward the point light source from an end, which is far from said point light source, of said optical waveguide plate such that the optical waveguide plate gradually thins toward the end.

10. The surface light source device according to claim 1, wherein an inclined surface which is curved is formed on the surface of the optical waveguide plate such that the optical waveguide plate gradually thins toward an end far from said point light source.

11. The surface light source device according to claim 1, wherein an inclined surface is formed on the light output surface of the optical waveguide plate such that the optical waveguide plate gradually thins toward an end far from said point light source.

12. The surface light source device according to claim 1, wherein inclined surfaces are respectively formed in the vicinities of three sides excluding a side, on which the light incidence surface is positioned, of said optical waveguide plate such that the optical waveguide plate gradually thins toward its edge.

13. The surface light source device according to claim 9, wherein an inclined surface is formed at a corner of said optical waveguide plate.

14. The surface light source device according to claim 9, wherein the inclined surface is formed so as not to reach an end of the optical waveguide plate.

15. A liquid crystal display device comprising a liquid crystal display panel for producing an image and the surface light source device according to claim 1 for illuminating said liquid crystal display panel.

16. A portable telephone having a send/receive function, further comprising a display section including the liquid crystal display device according to claim 15.

17. An information terminal having an information processing function, further comprising a display section including the liquid crystal display device according to claim 15.

18. A surface light source device comprising an optical waveguide plate for confining light introduced from a light incidence surface thereof and emitting the light outward from a light output surface thereof, and a point light source disposed on the side of the light incidence surface of the optical waveguide plate, wherein a diffuse pattern is formed almost all over a surface, on the opposite side of the light output surface, of the optical waveguide plate, and the diffuse pattern comprises a plurality of diffuse pattern elements which are discretely disposed, each of the diffuse pattern elements has a surface directed toward the point light source, a direction normal to the surface being approximately parallel to a plane which includes a direction along the line connecting the diffuse pattern element and the point light source and is perpendicular to the light output surface of the optical waveguide plate.

19. A surface light source device comprising an optical waveguide plate for confining light introduced from a light incidence surface thereof and emitting the light outward from a light output surface thereof, and a point light source disposed on the side of the light incidence surface of the optical waveguide plate, wherein a diffuse pattern, which includes a plurality of discretely diposed diffuse pattern elements, is formed almost all over a surface, on the opposite side of the light output surface, of the optical waveguide plate, and a partial area of said diffuse pattern has directionality in relation to the shapes of a plurality of diffuse pattern elements in the partial area, the direction in which the correlation length of the diffuse pattern in the partial area is the longest is substantially perpendicular to the direction along the line connecting the partial area and the point light source.

20. A surface light source device comprising an optical waveguide plate for confining light introduced from a light incidence surface thereof and emitting the light outward from a light output surface thereof, and a point light source disposed on the side of the light incidence surface of the optical waveguide plate, wherein a diffuse pattern is formed almost all over a surface, on the opposite side of the light output surface, of the optical waveguide plate, and the density of said diffuse pattern is approximately zero in the position of said point light source, and in the vicinity of said point light source, (the density of the diffuse pattern)/{(the thickness of the optical waveguide plate)×(the distance from the point light source)} is approximately constant.

21. The surface light source device according to claim 20, wherein a plurality of point light sources are provided so as to face the light incidence surface of the optical waveguide plate, and the density of said diffuse pattern is approximately zero in the position of each of point the light sources.

22. A liquid crystal display device comprising a liquid crystal display panel for producing an image and the surface light source device according to claim 12 for illuminating said liquid crystal display panel.

23. A portable telephone having a send/receive function, further comprising a display section including the liquid crystal display device according to claim 22.

24. An information terminal having an information processing function, further comprising a display section including the liquid crystal display device according to claim 22.

25. A surface light source device comprising an optical waveguide plate for confining light introduced from a light incidence surface thereof and emitting the light outward from a light output surface thereof, and a point light source, smaller than the width of the light incidence surface of the optical waveguide plate, disposed on the side of the light incidence surface of the optical waveguide plate, wherein a diffuse pattern is formed almost all over a surface, on the opposite side of the light output surface, of the optical waveguide plate, in the vicinity of said point light source, (the density of the diffuse pattern)/[(the thickness of the optical waveguide plate)×(the distance from the light source)] is approximately constant, and as the distance from said light source increases, (the density of the diffuse pattern)/[(the thickness of the optical waveguide plate)×(the distance from the light source)] increases.

26. A portable telephone having a send/receive function, further comprising a display section including the liquid crystal display device according to claim 25.

27. An information terminal having an information processing function, further comprising a display section including the liquid crystal display device according to claim 26.

28. An information terminal having an information processing function, further comprising a display section including the liquid crystal display device according to claim 26.

29. A surface light source device comprising an optical waveguide plate for confining light introduced from a light incidence surface thereof and emitting the light outward from a light output surface thereof, and a light source, smaller than the width of the light incidence surface of the optical waveguide plate, disposed on the side of the light incidence surface of the optical waveguide plate, wherein a return reflecting portion having two sides at an angle of approximately 45° to the direction along the line connecting each of the sides and the light source is provided on an outer peripheral surface of said optical waveguide plate or in the vicinity of the outer peripheral surface.

30. The surface light source device according to claim 29, wherein the two sides constituting said return reflecting portion have an equal length.

31. The surface light source device according to claim 21, wherein a part of said optical waveguide plate is cut, and the return reflecting portion is formed on an inner surface of the cut part.

* * * * *